United States Patent
Cha et al.

(10) Patent No.: US 10,974,608 B2
(45) Date of Patent: Apr. 13, 2021

(54) METHOD AND APPARATUS FOR SELECTIVELY PERFORMING FULL BRIDGE CONTROL AND HALF BRIDGE CONTROL IN WIRELESS POWER TRANSFER SYSTEM USING LCCL-S RESONANT NETWORK

(71) Applicants: Hyundai Motor Company, Seoul (KR); Kia Motors Corporation, Seoul (KR); Research & Business Foundation Sungkyunkwan University, Gyeonggi-do (KR)

(72) Inventors: Jae Eun Cha, Gyeonggi-do (KR); Gyu Yeong Choe, Gyeonggi-do (KR); Woo Young Lee, Gyeonggi-do (KR); Jong Eun Byun, Gyeonggi-do (KR); Min Kook Kim, Gyeonggi-do (KR); Sang Joon Ann, Gyeonggi-do (KR); Byoung Kuk Lee, Gyeonggi-do (KR); Dong Myoung Joo, Gyeonggi-do (KR)

(73) Assignees: Hyundai Motor Company, Seoul (KR); Kia Motors Corporation, Seoul (KR); Research & Business Foundation Sungkyunkwan University, Gyeonggi-do (KR)

( * ) Notice: Subject to any disclaimer, the term of this patent is extended or adjusted under 35 U.S.C. 154(b) by 260 days.

(21) Appl. No.: 16/038,590

(22) Filed: Jul. 18, 2018

(65) Prior Publication Data
US 2019/0023134 A1 Jan. 24, 2019

(30) Foreign Application Priority Data

Jul. 19, 2017 (KR) ..................... 10-2017-0091720
Jun. 14, 2018 (KR) ..................... 10-2018-0068171

(51) Int. Cl.
*H02J 50/12* (2016.01)
*B60L 53/122* (2019.01)
(Continued)

(52) U.S. Cl.
CPC ........... *B60L 53/122* (2019.02); *B60L 11/182* (2013.01); *B60L 53/126* (2019.02); *B60L 53/22* (2019.02);
(Continued)

(58) Field of Classification Search
CPC ............................... H02J 50/00; B60L 53/00
See application file for complete search history.

(56) References Cited

U.S. PATENT DOCUMENTS

| | | | | |
|---|---|---|---|---|
| 2011/0285349 A1* | 11/2011 | Widmer | .................. | H02J 50/60 |
| | | | | 320/108 |
| 2012/0161696 A1* | 6/2012 | Cook | .................... | B60L 11/182 |
| | | | | 320/108 |

(Continued)

OTHER PUBLICATIONS

S. Ann et al., "Integrated Control Strategy of IPT System for Electric Vehicles for Light Load Efficiency Improvement", Department of Electrical and Computer Engineering, pp. 1-3 (May 3, 2018).

(Continued)

*Primary Examiner* — Rexford N Barnie
*Assistant Examiner* — Joseph N Inge
(74) *Attorney, Agent, or Firm* — Mintz Levin Cohn Ferris Glovsky and Popeo, P.C.; Peter F. Corless

(57) ABSTRACT

A method for selectively performing a full bridge control and a half bridge control in a WPT system using an LCCL-S resonant network may include: performing the full bridge control by controlling the switches not connected in series of the full bridge inverter to operate simultaneously; calculating a coupling coefficient of the WPT system; determining whether it is possible to switch the full bridge control to the (Continued)

half bridge control based on the calculated coupling coefficient; in response to determining that it is possible to switch the full bridge control to the half bridge control, calculating a load of the WPT system; and performing the half bridge control for the full bridge inverter based on the calculated load.

16 Claims, 15 Drawing Sheets

(51) Int. Cl.

| | |
|---|---|
| *B60L 11/18* | (2006.01) |
| *H02M 3/335* | (2006.01) |
| *H02J 7/02* | (2016.01) |
| *B60L 53/22* | (2019.01) |
| *B60L 53/38* | (2019.01) |
| *B60L 53/126* | (2019.01) |
| *H02J 50/90* | (2016.01) |
| *H04B 5/00* | (2006.01) |
| *H02M 3/337* | (2006.01) |
| *H02M 1/00* | (2006.01) |

(52) U.S. Cl.
CPC ............. *B60L 53/38* (2019.02); *H02J 7/025* (2013.01); *H02J 50/12* (2016.02); *H02M 3/33515* (2013.01); *B60L 2210/10* (2013.01); *H02J 50/90* (2016.02); *H02M 3/337* (2013.01); *H02M 2001/0058* (2013.01); *H04B 5/0037* (2013.01)

(56) References Cited

U.S. PATENT DOCUMENTS

| | | | |
|---|---|---|---|
| 2012/0169137 A1* | 7/2012 | Lisi | H02J 50/40 |
| | | | 307/104 |
| 2013/0039099 A1* | 2/2013 | Wu | H02M 7/53871 |
| | | | 363/40 |
| 2013/0221758 A1* | 8/2013 | Kai | H02J 7/025 |
| | | | 307/104 |
| 2014/0054970 A1* | 2/2014 | Keeling | H02J 50/90 |
| | | | 307/104 |
| 2016/0079766 A1* | 3/2016 | Jeong | H02J 7/025 |
| | | | 307/104 |
| 2016/0176300 A1* | 6/2016 | Bucher | B60L 11/182 |
| | | | 307/104 |
| 2016/0294217 A1* | 10/2016 | Mi | H02J 7/025 |
| 2016/0329752 A1* | 11/2016 | Bae | H04B 5/0037 |
| 2017/0063251 A1* | 3/2017 | Ye | H02M 3/33576 |
| 2017/0240055 A1* | 8/2017 | Nguyen | H02J 50/12 |

OTHER PUBLICATIONS

S. Ann et al., "Integrated Control of Bridge Type Inductive Power Transfer Systems for Light Load Efficiency Improvement", pp. 1357-1362, IEEE, (Mar. 8, 2018).

S. Ann et al., "High Efficiency Operation of the IPT converter with Full and Half bridge Control for Electric Vehicles", The Transactions of the Korean Institute of Power Electronics, 22(5), pp. 423-430 (2017).

S. Ann et al., "High Efficiency Operation of the IPT converter with Full and Half bridge Control for Electric Vehicles" (Nov. 25, 2016).

\* cited by examiner

Asymmetric duty

METHOD AND APPARATUS FOR SELECTIVELY PERFORMING FULL BRIDGE CONTROL AND HALF BRIDGE CONTROL IN WIRELESS POWER TRANSFER SYSTEM USING LCCL-S RESONANT NETWORK

CROSS-REFERENCE TO RELATED APPLICATIONS

The present application claims the benefit of priority to Korean Patent Application No. 10-2017-0091720, filed on Jul. 19, 2017 in the Korean Intellectual Property Office, and Korean Patent Application No. 10-2018-0068171, filed on Jun. 14, 2018 in the Korean Intellectual Property Office, the entire contents of which are incorporated herein for all purposes by reference.

TECHNICAL FIELD

The present disclosure relates generally to wireless power transfer (WPT) systems and, more particularly, to a method and an apparatus for selectively performing a full bridge control and a half bridge control in a WPT system using an inductance-capacitance-capacitance-inductance-series (LCCL-S) resonant network.

BACKGROUND

An electric vehicle (EV) charging system may be defined as a system for charging a high-voltage battery mounted in an EV using power from an energy storage device or a power grid of a commercial power source. The EV charging system may have various forms according to the type of EV. For example, the EV charging system may be classified into one of a conductive-type using a charging cable and a non-contact wireless power transfer (WPT)-type (also referred to as an "inductive type"). In the case of the inductive-type charging using a WPT system, when a high-voltage battery mounted on the EV is to be charged, the EV may be positioned proximate to a ground assembly (GA) located in a charging station or a charging spot capable of EV charging.

Meanwhile, an LCCL-S resonant network may be applied to the WPT system that transmits wireless power to the EV. However, the output voltage of the WPT system using such a constant voltage resonant network varies according to a coupling coefficient. Therefore, it is necessary to limit the output voltage by reducing the input voltage to the resonant network because there is a risk of burnout of a semiconductor and a passive element due to excessive output voltage under the high coupling coefficient condition.

SUMMARY

Embodiments of the present disclosure provide a method for selectively performing a full bridge control and a half bridge control in a wireless power transfer (WPT) system using an inductance-capacitance-capacitance-inductance-series (LCCL-S) resonant network.

Embodiments of the present disclosure also provide an apparatus for selectively performing a full bridge control and a half bridge control in a WPT system using an LCCL-S resonant network.

According to embodiments of the present disclosure, a method for selectively performing a full bridge control and a half bridge control in a WPT system using an LCCL-S resonant network may include: performing the full bridge control by controlling the switches not connected in series of the full bridge inverter to operate simultaneously; calculating a coupling coefficient of the WPT system; determining whether it is possible to switch the full bridge control to the half bridge control based on the calculated coupling coefficient; in response to determining that it is possible to switch the full bridge control to the half bridge control, calculating a load of the WPT system; and performing the half bridge control for the full bridge inverter based on the calculated load.

The performing of the half bridge control can include controlling one of the one or more switches connected in series of the full bridge inverter to be in an ON or OFF state at all times, causing the full bridge inverter to operate in a manner equivalent to a half bridge inverter.

The determining of whether it is possible to switch the full bridge control to the half bridge control may comprise determining a coupling coefficient range in which the half bridge control satisfies one or more design requirements; and comparing the calculated coupling coefficient with a threshold value according to the determined coupling coefficient range.

The one or more design requirements can be predefined for at least one of the coupling coefficient, an output voltage, and the load of the WPT system.

The performing of the half bridge control may comprise comparing the calculated load with a control switching point predetermined according to the coupling coefficient range, and performing the half bridge control according to the comparing of the calculated load with a control switching point.

The control switching point may refer to a load corresponding to a position where an efficiency of the full bridge control and an efficiency of the half bridge control intersect in the coupling coefficient range.

The method may further include: receiving, by the full bridge inverter, a direct current (DC) power source; outputting, by the full bridge inverter, an alternating current (AC) voltage; receiving, by a compensation network, the AC voltage from the full bridge inverter; generating, by a compensation network, an induced electromotive force in a reception coil incorporated in a reception pad of an electric vehicle (EV); rectifying, by a rectifier, an induced current according to the induced electromotive force; storing, by the rectifier, a DC voltage in a capacitor; and converting, by a DC-DC converter, the DC voltage stored in the capacitor of the rectifier into a rated voltage of a battery equipped in the EV.

The full bridge inverter may comprise a first series circuit in which a first switch and a third switch are connected in series; and a second series circuit in which a fourth switch and a second switch are connected in series. Also, the first series circuit and the second series circuit may be connected in parallel with the DC power source.

The performing of the full bridge control can include operating the first switch and the second switch as a first pair simultaneously in an ON or OFF state; and operating the third switch and the fourth switch as a second pair simultaneously in an OFF or ON state, and the first pair and the second pair may be operated alternately.

The performing of the half bridge control can include operating the second switch in in an ON state; and operating the fourth switch in an OFF state, and the first switch and the third switch can be operated alternately.

Furthermore, in accordance with embodiments of the present disclosure, an apparatus for selectively performing a full bridge control and a half bridge control in a WPT system using an LCCL-S resonant network may comprise: at least one processor and a memory storing at least one instruction, which when executed by the at least one processor may cause the processor to: perform the full bridge control by controlling the switches not connected in series of the full bridge inverter to operate simultaneously; calculate a coupling coefficient of the WPT system; determine whether it is possible to switch the full bridge control to the half bridge control based on the calculated coupling coefficient; in response to determining that it is possible to switch the full bridge control to the half bridge control, calculate a load of the WPT system; and perform the half bridge control for the full bridge inverter based on the calculated load.

The performing of the half bridge control may include controlling one of the one or more switches connected in series of the full bridge inverter to be in an ON or OFF state at all times, causing the full bridge inverter to operate in a manner equivalent to a half bridge inverter.

The determining of whether it is possible to switch the full bridge control to the half bridge control can include determining a coupling coefficient range in which the half bridge control satisfies one or more design requirements; and comparing the calculated coupling coefficient with a threshold value according to the determined coupling coefficient range.

The one or more design requirements may be predefined for at least one of the coupling coefficient, an output voltage, and the load of the WPT system.

The performing of the half bridge control may include comparing the calculated load with a control switching point predetermined according to the coupling coefficient range; and performing the half bridge control according to the comparing of the calculated load with a control switching point.

The control switching point may refer to a load corresponding to a position where an efficiency of the full bridge control and an efficiency of the half bridge control intersect in the coupling coefficient range.

The WPT system may comprise the full bridge inverter receiving a direct current (DC) power source and outputting an alternating current (AC) voltage; a compensation network receiving the AC voltage from the full bridge inverter and generating an induced electromotive force in a reception coil incorporated in a reception pad of an EV; a rectifier rectifying an induced current according to the induced electromotive force and storing a DC voltage in a capacitor; and a DC-DC converter converting the DC voltage stored in the capacitor of the rectifier into a rated voltage of a battery equipped in the EV.

The full bridge inverter may comprise a first series circuit in which a first switch and a third switch are connected in series; and a second series circuit in which a fourth switch and a second switch are connected in series, wherein the first series circuit and the second series circuit are connected in parallel with the DC power source.

The performing of the full bridge control may include operating the second switch in ON state; and operating the fourth switch in OFF state, and the first pair and the second pair can be operated alternately.

The performing of the half bridge control may include operating the first switch and the second switch as a first pair simultaneously in an ON or OFF state; operating the third switch and the fourth switch as a second pair simultaneously in an OFF or ON state, and the first pair and the second pair may be operated alternately.

The method and apparatus for selectively performing a full bridge control and a half bridge control according to embodiments of the present disclosure in the WPT system using the LCCL-S resonant network can reduce the output voltage without changing the hardware in the WPT system. Even with a high coupling efficient, high light-load efficiency can be obtained using the half bridge control.

BRIEF DESCRIPTION OF DRAWINGS

Embodiments of the present disclosure will become more apparent by describing in detail embodiments of the present disclosure with reference to the accompanying drawings, in which.

Figure 1:
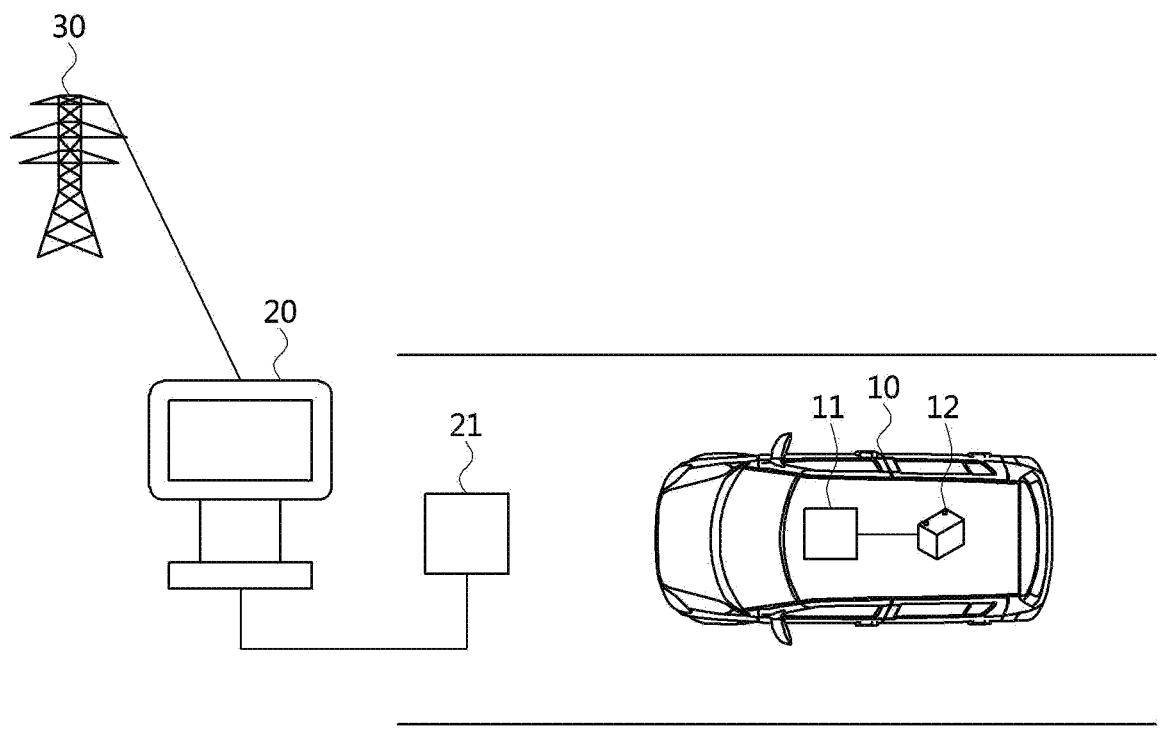
FIG. 1 is a conceptual diagram illustrating a concept of a wireless power transfer (WPT) to which embodiments of the present disclosure are applied.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

According to embodiments of the present disclosure, an EV charging system may basically be defined as a system for charging a high-voltage battery mounted on an EV by using power of an energy storage device or a power grid of a commercial power source. Such the EV charging system may have various forms according to the type of EV. For example, the EV charging system may be classified into a conductive type using a charging cable and a non-contact wireless power transfer (WPT) type (also referred to as an "inductive type"). According to embodiments of the present disclosure, a power source may include a residential or public electrical service or a generator utilizing vehicle-mounted fuel, and the like.

Terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An Electric Vehicle that recharges the on-vehicle primary battery by connecting to the power grid.

"Plug-in vehicle (PV)": An electric vehicle rechargeable through wireless charging from an electric vehicle supply equipment (EVSE) without using a physical plug or a physical socket.

"Heavy duty vehicle; H.D. Vehicle": Any four-or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system (WCS)": The system for wireless power transfer and control between the GA and VA including alignment and communications. This system transfers energy from the electric supply network to the electric vehicle electromagnetically through a two-part loosely coupled transformer.

"Wireless power transfer (WPT)": The transfer of electrical power from the AC supply network to the electric vehicle by contactless means.

"Utility": A set of systems which supply electrical energy and may include a customer information system (CIS), an advanced metering infrastructure (AMI), rates and revenue system, etc. The utility may provide the EV with energy through rates table and discrete events. Also, the utility may provide information about certification on EVs, interval of power consumption measurements, and tariff.

"Smart charging": A system in which EVSE and/or PEV communicate with power grid in order to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and right.

"Interoperability": A state in which components of a system interwork with corresponding components of the system in order to perform operations aimed by the system. Also, information interoperability may mean capability that two or more networks, systems, devices, applications, or components can efficiently share and easily use information without causing inconvenience to users.

"Inductive charging system": A system transferring energy from a power source to an EV through a two-part gapped core transformer in which the two halves of the transformer, primary and secondary coils, are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly (GA)": An assembly on the infrastructure side consisting of the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

"Vehicle assembly (VA)": An assembly on the vehicle consisting of the VA Coil, rectifier/power conversion unit and VA controller as well as the wiring to the vehicle batteries and between each unit, filtering circuits, housing(s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

"Primary device": An apparatus which provides the contactless coupling to the secondary device. That is, the primary device may be an apparatus external to an EV. When the EV is receiving power, the primary device may act as the source of the power to be transferred. The primary device may include the housing and all covers.

"Secondary device": An apparatus mounted on the EV which provides the contactless coupling to the primary device. That is, the secondary device may be installed in the EV. When the EV is receiving power, the secondary device may transfer the power from the primary to the EV. The secondary device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA Coil magnetic surface distance": the distance between the plane of the nearest magnetic or conducting component surface to the lower exterior surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized in case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In the present disclosure, the alignment may direct to a fine positioning of the wireless power transfer system.

"Pairing": A process by which a vehicle is correlated with the unique dedicated primary device, at which it is located and from which the power will be transferred. Pairing may include the process by which a VA controller and a GA controller of a charging spot are correlated. The correlation/ association process may include the process of establishment of a relationship between two peer communication entities.

"Command and control communication": The communication between the EV supply equipment and the EV exchanges information necessary to start, control and terminate the process of WPT.

"High level communication (HLC)": HLC is a special kind of digital communication. HLC is necessary for additional services which are not covered by command & control communication. The data link of the HLC may use a power line communication (PLC), but it is not limited.

"Low power excitation (LPE)": LPE means a technique of activating the primary device for the fine positioning and pairing so that the EV can detect the primary device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID distinguishes multiple wireless LANs. Therefore, all access points (APs) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is the name of the network to which one desires to connect. It is similar to SSID but can be a more extended concept.

"Basic service set identifier (BSSID)": BSSID consisting of 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller configured to manage the at least one GA. The GA may comprise at least one wireless communication device. The charging station may mean a place having at least one GA, which is installed in home, office, public place, road, parking area, etc.

According to embodiments of the present disclosure, a light load driving or light load operation may include, for example, charging a high voltage battery with a charging voltage lower than a predetermined rated voltage in the latter half of charging for the high voltage battery connected to the VA in the WPT system. Also, the light load operation may include a case in which the high-voltage battery of EV is charged at a relatively low voltage and at a low speed by using a low-speed charger such as a household charger.

Hereinafter, embodiments according to the present disclosure will be explained in detail by referring to accompanying figures.

FIG. 1 is a conceptual diagram illustrating a concept of a wireless power transfer (WPT) to which embodiments of the present disclosure are applied.

As shown in FIG. 1, a WPT may be performed by at least one component of an electric vehicle (EV) 10 and a charging station 20, and may be used for wirelessly transferring power to the EV 10.

Here, the EV 10 may be usually defined as a vehicle supplying an electric power stored in a rechargeable energy storage including a battery 12 as an energy source of an electric motor which is a power train system of the EV 10.

However, the EV 10 according to embodiments of the present disclosure may include a hybrid electric vehicle (HEV) having an electric motor and an internal combustion engine together, and may include not only an automobile but also a motorcycle, a cart, a scooter, and an electric bicycle.

Also, the EV 10 may include a power reception pad 11 including a reception coil for charging the battery 12 wirelessly and may include a plug connection for conductively charging the battery 12. Here, the EV 10 configured for conductively charging the battery 12 may be referred to as a plug-in electric vehicle (PEV).

Here, the charging station 20 may be connected to a power grid 30 or a power backbone, and may provide an alternating current (AC) power or a direct current (DC) power to a power transmission pad 21 including a transmission coil through a power link.

Also, the charging station 20 may communicate with an infrastructure management system or an infrastructure server that manages the power grid 30 or a power network through wired/wireless communications, and performs wireless communications with the EV 10.

Here, the wireless communications may be Bluetooth, Zigbee, cellular, wireless local area network (WLAN), or the like.

Also, for example, the charging station 20 may be located at various places including a parking area attached to the owner's house of the EV 10, a parking area for charging an EV at a gas station, a parking area at a shopping center or a workplace.

A process of wirelessly charging the battery 12 of the EV 10 may begin with first placing the power reception pad 11 of the EV 10 in an energy field generated by the power transmission pad 21, and making the reception coil and the transmission coil be interacted or coupled with each other. An electromotive force may be induced in the power reception pad 11 as a result of the interaction or coupling, and the battery 12 may be charged by the induced electromotive force.

The charging station 20 and the transmission pad 21 may be referred to as a ground assembly (GA) in whole or in part, where the GA may refer to the previously defined meaning.

All or part of the internal components and the reception pad 11 of the EV 10 may be referred to as a vehicle assembly (VA), in which the VA may refer to the previously defined meaning.

Here, the power transmission pad or the power reception pad may be configured to be non-polarized or polarized.

In a case that a pad is non-polarized, there is one pole in a center of the pad and an opposite pole in an external periphery. Here, a flux may be formed to exit from the center of the pad and return at all to external boundaries of the pad.

In a case that a pad is polarized, it may have a respective pole at either end portion of the pad. Here, a magnetic flux may be formed based on an orientation of the pad.

Figure 2:
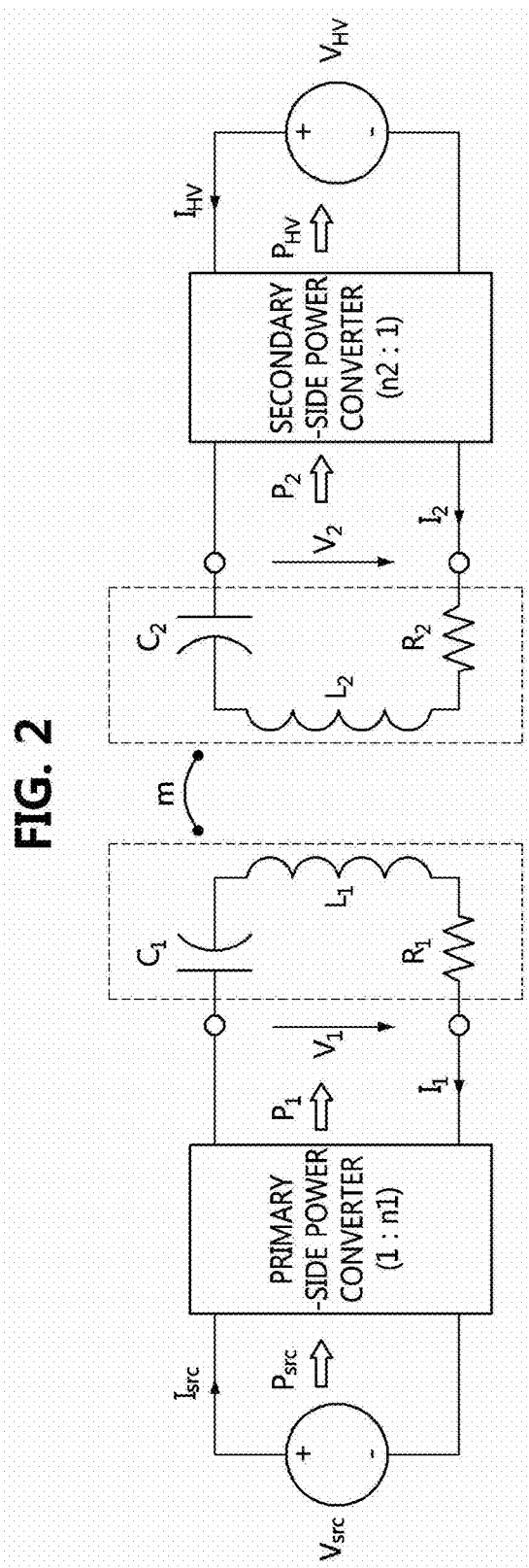
FIG. 2 is a conceptual diagram illustrating a WPT circuit according to embodiments of the present disclosure.

FIG. 2 is a conceptual diagram illustrating a WPT circuit according to embodiments of the present disclosure.

As shown in FIG. 2, a schematic configuration of a circuit in which a WPT is performed in an EV WPT system may be seen.

Here, the left side of FIG. 2 may be interpreted as expressing all or part of a power source $V_{src}$ supplied from the power network, the charging station 20, and the transmission pad 21 in FIG. 1, and the right side of FIG. 2 may be interpreted as expressing all or part of the EV including the reception pad and the battery.

First, the left side circuit of FIG. 2 may provide an output power $P_{src}$ corresponding to the power source $V_{src}$ supplied from the power network to a primary-side power converter. The primary-side power converter may supply an output power $P_1$ converted from the output power $P_{src}$ through frequency-converting and AC-to-DC/DC-to-AC converting to generate an electromagnetic field at a desired operating frequency in a transmission coil $L_1$.

Specifically, the primary-side power converter may include an AC/DC converter for converting the power $P_{src}$ which is an AC power supplied from the power network into a DC power, and a low frequency (LF) converter for converting the DC power into an AC power having an operating frequency suitable for wireless charging. For example, the operating frequency for wireless charging may be determined to be within 80 to 90 kHz.

The power $P_1$ output from the primary-side power converter may be supplied again to a circuit including the transmission coil $L_1$, a first capacitor $C_1$ and a first resistor $R_1$. Here, a capacitance of the first capacitor $C_1$ may be determined as a value to have an operating frequency suitable for charging together with the transmission coil $L_1$. Here, the first resistor $R_1$ may represent a power loss occurred by the transmission coil $L_1$ and the first capacitor $C_1$.

Further, the transmission coil $L_1$ may be made to have electromagnetic coupling, which is defined by a coupling coefficient m, with the reception coil $L_2$ so that a power $P_2$ is transmitted, or the power $P_2$ is induced in the reception coil $L_2$. Therefore, the meaning of power transfer for purposes of the present disclosure may be used together with the meaning of power induction.

Still further, the power $P_2$ induced in or transferred to the reception coil $L_2$ may be provided to a secondary-side power converter. Here, a capacitance of a second capacitor $C_2$ may be determined as a value to have an operating frequency suitable for wireless charging together with the reception coil $L_2$, and a second resistor $R_2$ may represent a power loss occurred by the reception coil $L_2$ and the second capacitor $C_2$.

The secondary-side power converter may include an LF-to-DC converter that converts the supplied power $P_2$ of a specific operating frequency to a DC power having a voltage level suitable for the battery $V_{HV}$ of the EV.

The electric power $P_{HV}$ converted from the power $P_2$ supplied to the secondary-side power converter may be output, and the power $P_{HV}$ may be used for charging the battery $V_{HV}$ disposed in the EV.

Here, the right side circuit of FIG. 2 may further include a switch for selectively connecting or disconnecting the reception coil $L_2$ with the battery $V_{HV}$. Here, resonance frequencies of the transmission coil $L_1$ and the reception coil $L_2$ may be similar or identical to each other, and the reception coil $L_2$ may be positioned near the electromagnetic field generated by the transmission coil $L_1$.

Here, the circuit of FIG. 2 should be understood as an illustrative circuit for WPT in the EV WPT system used for embodiments of the present disclosure, and is not limited to the circuit illustrated in FIG. 2.

On the other hand, since the power loss may increase as the transmission coil $L_1$ and the reception coil $L_2$ are located at a long distance, it may be an important factor to properly set the relative positions of the transmission coil $L_1$ and the reception coil $L_2$. Here, the transmission coil $L_1$ may be included in the transmission pad 21 in FIG. 1, and the reception coil $L_2$ may be included in the reception pad 11 in FIG. 1. Therefore, positioning between the transmission pad and the reception pad or positioning between the EV and the transmission pad will be described below with reference to the drawings.

Figure 3:
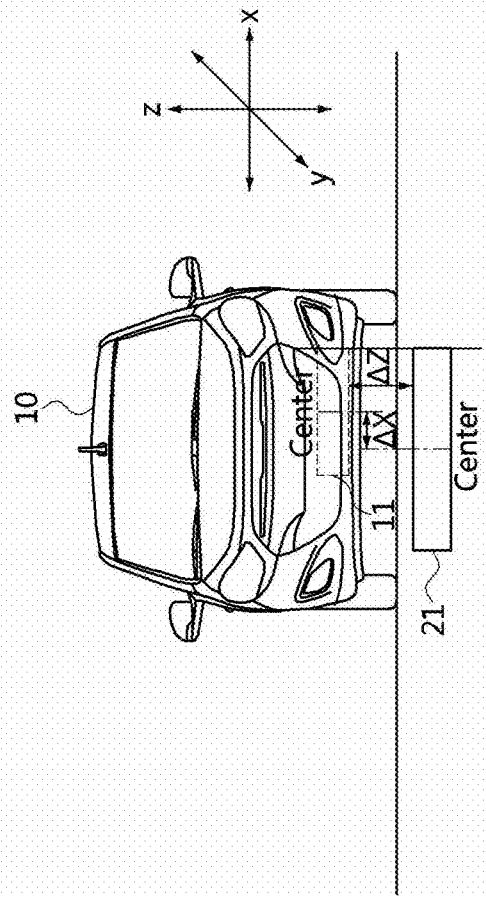
FIG. 3 is a conceptual diagram for explaining a concept of alignment in an EV WPT according to embodiments of the present disclosure.

FIG. 3 is a conceptual diagram for explaining a concept of alignment in an EV WPT according to embodiments of the present disclosure.

As shown in FIG. 3, a method of aligning the power transmission pad 21 and the power reception pad 11 in the EV in FIG. 1 will be described. Here, a positional alignment may correspond to the alignment, which is the above-mentioned term, and thus may be defined as a positional alignment between the GA and the VA, but is not limited to the alignment of the transmission pad and the reception pad.

Although the transmission pad 21 is illustrated as positioned below a ground surface as shown in FIG. 3, the transmission pad 21 may also be positioned on the ground surface, or positioned such that a top portion surface of the transmission pad 21 is exposed below the ground surface.

The reception pad 11 of the EV may be defined by different categories according to its height (defined in the z-direction) measured from the ground surface. For example, a class 1 for reception pads having a height of 100-150 millimeters (mm) from the ground surface, a class 2 for reception pads having a height of 140-210 mm, and a class 3 for reception pads having a height of 170-250 mm may be defined. Here, the reception pad may support a part of the above-described classes 1 to 3. For example, only the class 1 may be supported according to the type of the reception pad 11, or the class 1 and 2 may be supported according to the type of the reception pad 11.

Here, the height of the reception pad measured from the ground surface may correspond to the previously defined term "vehicle magnetic ground clearance."

Further, the position of the power transmission pad 21 in the height direction (i.e., defined in the z-direction) may be determined to be located between the maximum class and the minimum class supported by the power reception pad 11. For example, when the reception pad supports only the class 1 and 2, the position of the power transmission pad 21 may be determined between 100 and 210 mm with respect to the power reception pad 11.

Still further, a gap between the center of the power transmission pad 21 and the center of the power reception pad 11 may be determined to be located within the limits of the horizontal and vertical directions (defined in the x- and y-directions). For example, it may be determined to be located within ±75 mm in the horizontal direction (defined in the x-direction), and within ±100 mm in the vertical direction (defined in the y-direction).

Here, the relative positions of the power transmission pad 21 and the power reception pad 11 may be varied in accordance with their experimental results, and the numerical values should be understood as exemplary.

Although the alignment between the pads is described on the assumption that each of the transmission pad 21 and the reception pad 11 includes a coil, more specifically, the alignment between the pads may mean the alignment between the transmission coil (or GA coil) and the reception coil (or VA coil) which are respectively included in the transmission pad 21 and the reception pad 11.

Figure 4:
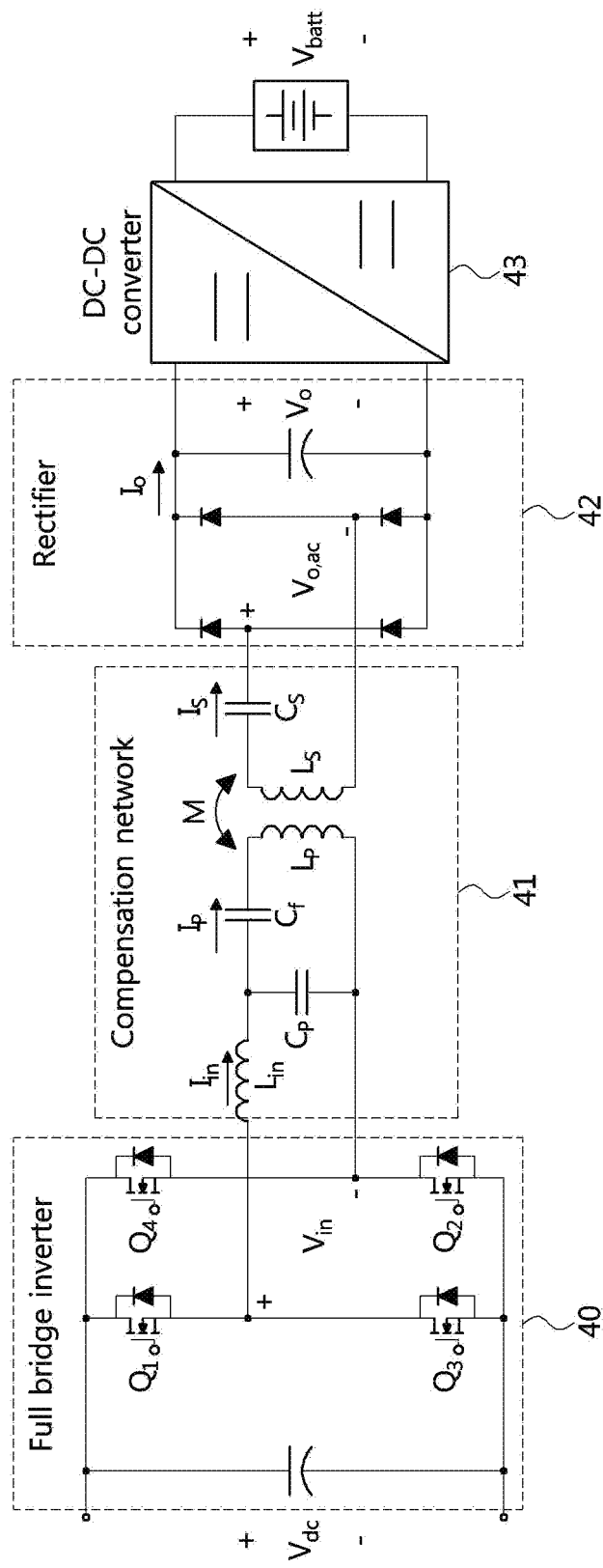
FIG. 4 is a circuit diagram illustrating a WPT system using an LCCL-S resonant network according embodiments of the present disclosure.

FIG. 4 is a circuit diagram illustrating a WPT system using an LCCL-S resonant network according to embodiments of the present disclosure.

When the EV wireless charging circuit according to FIG. 2 is implemented by applying the LCCL-S resonant network, an equivalent circuit shown in FIG. 4 may be derived.

Specifically, referring to FIG. 4, a WPT system using an LCCL-S resonant network may comprise a full bridge inverter 40 receiving a DC power source $V_{dc}$ and outputting an AC voltage $V_{in}$, a compensation network 41 receiving the AC voltage from the full bridge inverter 40 and generating an induced electromotive force in a reception coil incorporated in a reception pad of the EV, a rectifier 42 rectifying an induced current according to the induced electromotive force and storing a DC voltage $V_o$ in a capacitor, and a DC-DC converter 43 converting the DC voltage $V_o$ stored in the capacitor of the rectifier 42 into a rated voltage $V_{batt}$ of a battery built in the EV.

The full bridge inverter 40 may include a first series circuit and a second series circuit connected in parallel with the DC power source $V_{dc}$. Here, the first series circuit may be a circuit in which a first switch $Q_1$ and a third switch $Q_3$ are connected in series. Also, the second series circuit may be a circuit in which a fourth switch $Q_4$ and a second switch $Q_2$ are connected in series. The full bridge inverter 40 may supply, as an input voltage of the compensation network 41, a voltage difference between a contact $V_{in}+$ between the first and third switches $Q_1$ and $Q_3$ and a contact $V_{in}-$ between the fourth and second switches $Q_4$ and $Q_2$. In this case, a MOSFET switch may be used as the switches used in the full bridge inverter 40. Also, each switch may be connected in parallel with at least one diode.

The compensation network may include a transmission-side resonant circuit of an inductance-capacitance-capacitance-inductance (LCCL) type connected to the input voltage yip transferred by the full-bridge inverter 40, and a reception-side resonant circuit outputting an induced current $I_s$ generated by an electromotive force induced from the transmission-side resonance circuit.

The transmission-side resonant circuit of the LCCL type may include an input inductor $L_{in}$ and a first capacitor $C_p$ connected in series with the input voltage, and a second capacitor $C_f$ and a transmission coil $L_p$ connected in series with a node between the input inductor $L_{in}$ and the first capacitor $C_p$. Also, the reception-side resonant circuit may be connected in series with a reception coil $L_s$ and a reception capacitor $C_s$, which are magnetically coupled to the transmission coil $L_p$ (mutual inductance thereof is defined as M). An inducted electromotive force may be derived in the reception coil $L_s$ and the reception capacitor $C_s$.

The rectifier 42 may include a first rectifying circuit in which a first diode and a second diode are connected in series and a second rectifying circuit in which a third diode and a fourth diode are connected in series, and the first rectifying circuit and the second rectifying circuit may be connected in parallel with each other. The induced current Is of the compensation network 41 may be introduced through a node between the first diode and the second diode and/or a node between the third diode and the fourth diode.

The rectifier 42 may store a current $I_0$ rectified from the first rectifying circuit and/or the second rectifying circuit in a capacitor $V_o$ connected in parallel with the first rectifying circuit and the second rectifying circuit.

The circuit of the WPT system using the LCCL-S resonant network is not necessarily limited to the configuration shown in FIG. 4. For example, the resonant circuit of the compensation network 41 may be implemented in parallel.

Meanwhile, in the WPT system using the LCCL-S resonant network according to FIG. 4, the output voltage $V_o$ of the resonant network (or, the output voltage of the rectifier 42) may be reduced by controlling the full bridge inverter 40. Here, in order to reduce the output voltage $V_o$ of the resonant network at a high coupling coefficient M, the full bridge inverter may be generally controlled in such a way as to cancel the network input voltage $V_{in}$.

Hereinafter, a control method of a full bridge inverter for canceling the input voltage of the network will be described.

Figure 5A:
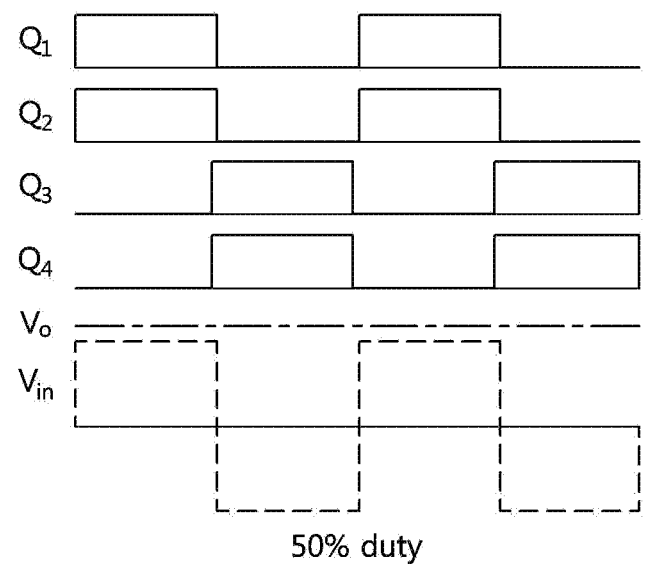
FIGS. 5A to 5C are diagrams for explaining a control method of a full bridge inverter for canceling an input voltage of a network.
Figure 5B:
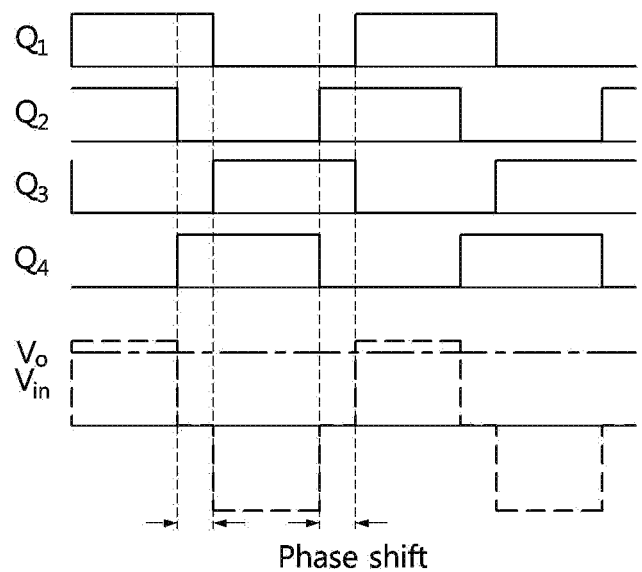
Figure 5C:
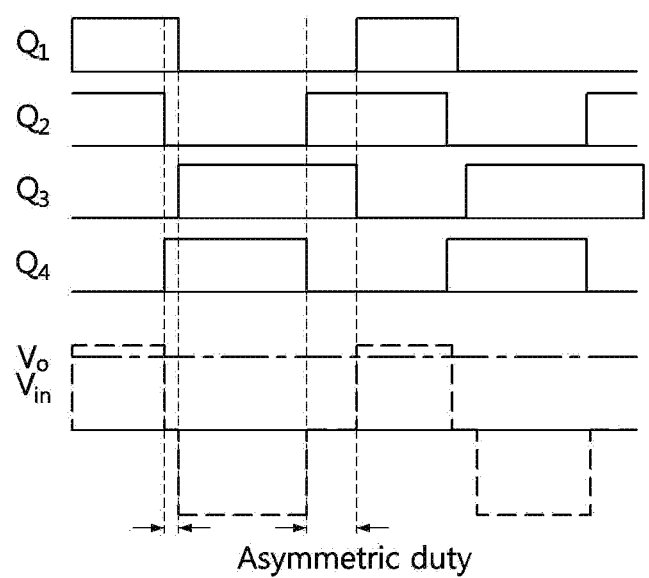

FIGS. 5A to 5C are diagrams for explaining a control method of a full bridge inverter for canceling an input voltage of a network.

Generally, control methods for canceling the input voltage may include a phase shift control, symmetric or asymmetric control, and the like.

Referring first to FIG. 5A, a 50% duty control method will be explained. Specifically, if the switches are operated alternately in a manner that the switches $Q_1$ and $Q_2$ are turned on in a first step, and the switches $Q_3$ and $Q_4$ are turned on in the next step after the first step, it can be seen that each step occupies 50% duty at the input voltage $V_{in}$.

Referring next to FIG. 5B, a phase shift control method will be explained. Specifically, unlike that of FIG. 5A, it can be seen that the two switches operating simultaneously in each step operate to have a phase difference.

Referring next to FIG. 5C, an asymmetric control method will be explained. Specifically, it can be seen that the two switches operating simultaneously in each step may have different duty (or have an asymmetric duty).

Figure 6:
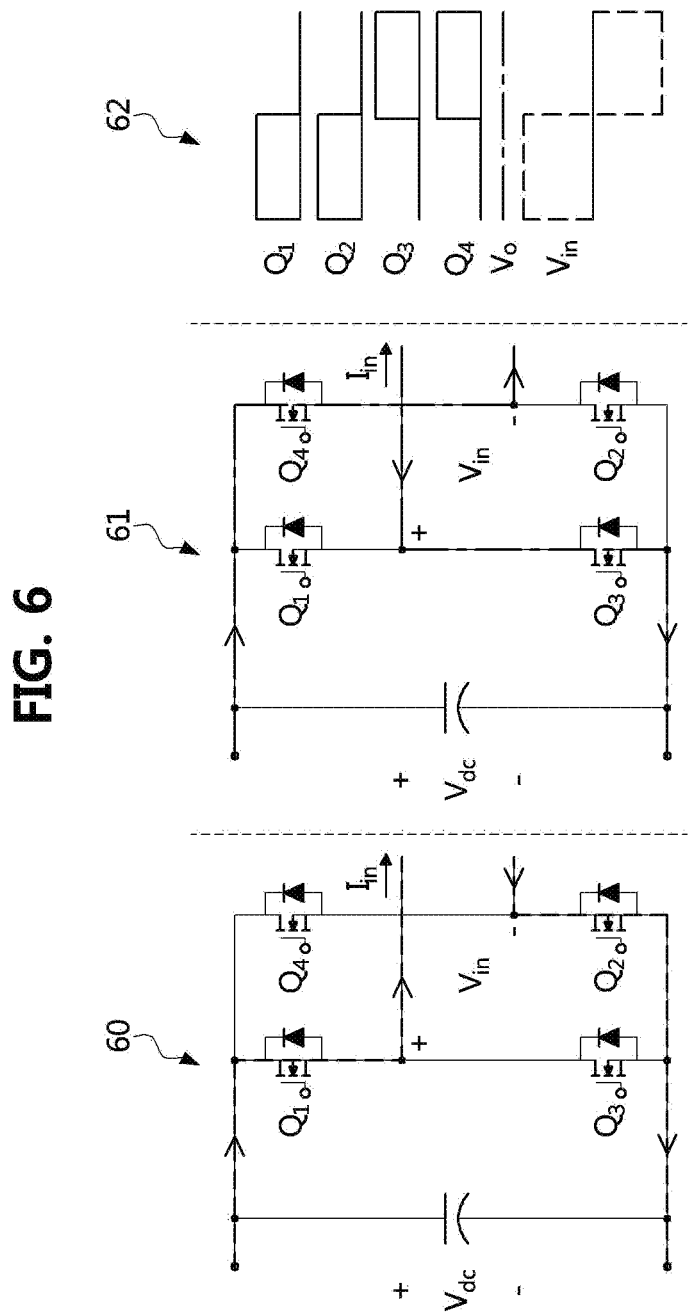
FIG. 6 is a conceptual diagram for explaining a control method of operating a full bridge inverter of FIG. 4 as a full bridge inverter.

FIG. 6 is a conceptual diagram for explaining a control method of operating a full bridge inverter of FIG. 4 as a full bridge inverter.

As shown in FIG. 6, when the full bridge inverter according to FIG. 4 is controlled by the 50% duty control method, operation flows of the respective switches can be identified.

Specifically, as indicated by a reference numeral 60, a current flow when the switches $Q_1$ and $Q_2$ are turned on and the switches $Q_3$ and $Q_4$ are turned off in the first step may be identified.

Also, as indicated by a reference numeral 61, a current flow when the switches $Q_4$ and $Q_3$ are turned on and the switches $Q_1$ and $Q_2$ are turned off in the next step may be identified.

Operation flows of the switches $Q_1$ to $Q_4$, the input voltage $V_{in}$ and the output voltage $V_o$ according to the control flows of each step according to the reference numerals 60 and 61 can be identified by a reference numeral 62. Referring to the reference numeral 62, it can be seen that, like in FIG. 5A, both switches are simultaneously turned on or off in each step.

On the other hand, a half bridge inverter has an advantage that input and output voltages are lower than those of the full bridge inverter. Thus, combining the advantages of both types of inverters makes it possible to implement a more efficient WPT system.

Hereinafter, a method of operating a full bridge inverter as a half bridge inverter without changing any hardware in the WPT system according to FIG. 4 will be described.

Figure 7:
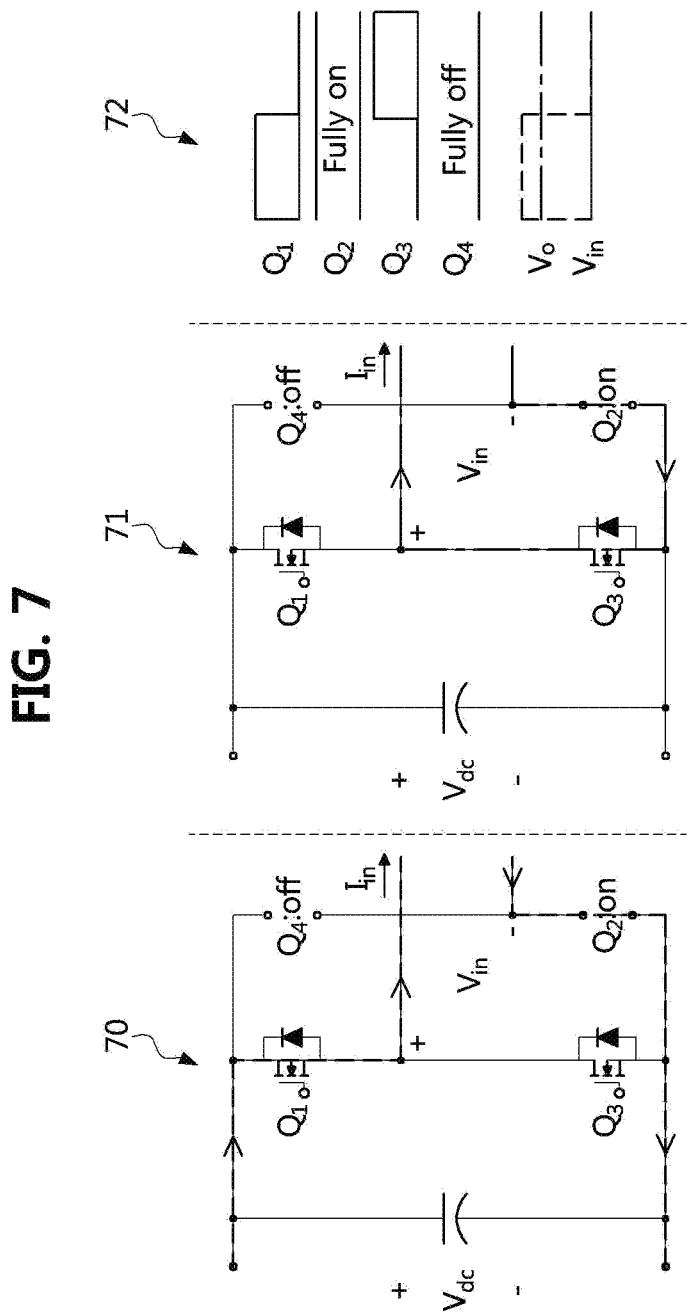
FIG. 7 is a conceptual diagram for explaining a control method of operating the full bridge inverter of FIG. 4 as a half bridge inverter.

FIG. 7 is a conceptual diagram for explaining a control method of operating the full bridge inverter of FIG. 4 as a half bridge inverter.

As shown in FIG. 7, a method of controlling the full bridge inverter according to FIG. 4 to operate as a half bridge inverter will be identified.

Specifically, in order to operate the full bridge inverter according to FIG. 4 as a half bridge inverter, the second switch $Q_2$ may be always controlled to ON state and the fourth switch $Q_4$ may be always controlled to OFF state. That is, only the first switch and the third switch may be operated while the second switch and the fourth switch are controlled to be in the ON and OFF states, respectively, and thus the full bridge inverter may be operated in the same manner as the half bridge inverter.

As indicated by reference numeral 70, a current flow when the switch $Q_1$ is turned on and the switch $Q_3$ is turned off in the first step can be identified. In this case, the switch $Q_2$ is always kept in ON state and the switch $Q_4$ is always kept in OFF state.

As indicated by reference numeral 71, a current flow when the switch $Q_1$ is turned off and the switch $Q_3$ is turned on in the next step of the first step can be identified. In this case, the switch $Q_2$ is always kept in ON state and the switch $Q_4$ is always kept in OFF state.

As indicated by reference numeral 72, the switch $Q_1$ is turned ON in the first step, and the switch $Q_3$ is turned ON in the next step. Here, it can be confirmed that the switch $Q_2$ is always kept in ON state and the switch $Q_4$ is always kept in OFF state. In particular, it can be seen that the input voltage $V_{in}$ and the output voltage $V_o$ indicated by the reference numeral 72 may be lower than (or about half of) the voltages according to the control of the full bridge inverter as indicated by the reference numeral 62 in FIG. 6.

In the WPT system according to FIG. 4, the output voltages $V_{o,ac}$ may be determined as shown below in Equation 1.

$$V_{o,ac}\downarrow = \frac{MV_{in}}{L_{in}} = k\frac{V_{in}\downarrow \sqrt{L_p L_s}}{L_{in}} \quad \text{[Equation 1]}$$

Referring to Equation 1, it can be seen that the output voltage $v_{o,ac}$ is lowered when the input voltage $V_{in}$ is lowered in the WPT system according to FIG. 4. Here, k may mean a coupling coefficient between the transmission coil $L_p$ and the reception coil $L_s$ according to the mutual inductance M.

Meanwhile, the input voltage and the current $I_p$ flowing in the transmission coil may have a relationship expressed by Equation 2 below.

$$I_p \downarrow = -j\frac{V_{in}\downarrow}{\omega_o L_{in}} \quad \text{[Equation 2]}$$

Referring to Equation 2, it can be seen that the current $I_p$ flowing in the transmission coil decreases when the input voltage $V_{in}$ decreases. In Equations 1 and 2, each symbol may be understood as each corresponding symbol in the circuit diagram of FIG. 4, and a further explanation will be omitted.

Referring to Equations 1 and 2, when the full bridge inverter is operated as a half bridge inverter, as the input voltage $V_{in}$ decreases, the output voltages $V_{o,ac}$ and the current $I_p$ flowing through the transmission coil also decrease. Here, if the current flowing through the transmission coil irrespective of a load change is reduced, a light-load efficiency is increased, so that the full bridge inverter is advantageously controlled as the half bridge inverter.

Hereinafter, the method of controlling the full bridge inverter according to FIG. 4 as in FIG. 6 may be defined as a full bridge control, and the method of controlling the full bridge inverter according to FIG. 4 as in FIG. 7 may be defined as a half bridge control.

Figure 8:
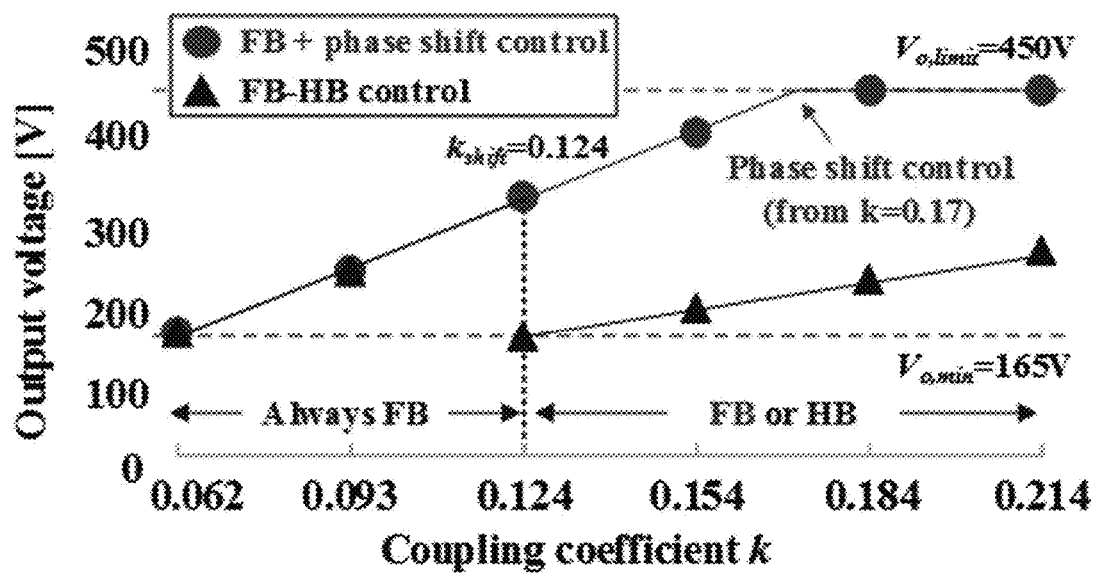
FIG. 8 is a graph for explaining a method for determining an optimum condition for controlling a full bridge inverter as a half bridge converter according to embodiments of the present disclosure.

FIG. 8 is a graph for explaining a method for determining an optimum condition for controlling a full bridge inverter as a half bridge converter according to embodiments of the present disclosure.

In order to determine whether to perform the full bridge control or the half bridge control, design requirements for the WPT system should be defined first.

The design requirements for the WPT system may be defined for load, coupling coefficient, and output voltage, for example, as shown below in Table 1.

TABLE 1

| Design Point | | | Δk | Range of output voltage ΔV$_o$ |
|---|---|---|---|---|
| k = 0.062 | P$_o$ = 3.3 [kW] | V$_o$ = 165 P[V] | 0.062~0.214 | 165~450 [V] |

Referring to Table 1, it is assumed that the coupling coefficient k is 0.062, the load $P_o$ is 3.3 kW and the output voltage $V_o$ is 165 V as the design point (or the most desirable design requirements). Also, it can be seen that an allowable range of the coefficient k is 0.062 to 0.214, and an allowable range of the output voltage $V_o$ is 165 to 450 V.

Referring to FIG. 8, in the range satisfying the design requirements in Table 1, a graph FB representing the output voltage versus the coupling coefficient when controlling the full bridge inverter as the full bridge inverter, and a graph HB representing the output voltage versus the coupling coefficient when controlling the full bridge inverter as the half bridge inverter are illustrated as combined.

When controlling the full bridge inverter as the half bridge inverter (indicated by HB), since the output voltage when k is less than 0.124 does not satisfy the minimum value (165V) defined in the design requirements, the output voltage is identified to be illustrated only for k above 0.124. Therefore, to meet the design requirements, the full bridge inverter should always be controlled as the full bridge inverter (indicated by FB) in the range where the coupling coefficient k is less than 0.124.

On the other hand, in the range where the coupling coefficient k is greater than 0.124, the design requirements can be met even if the full bridge inverter is controlled as a half bridge inverter. Therefore, in the range where the coupling coefficient k is larger than 0.124, the full bridge control and the half bridge control can be selected according to the load defined in the design requirements.

In addition, when the coupling coefficient k is greater than 0.17 and the full bridge inverter is controlled by the full bridge control manner, the maximum value of the output voltage defined by the design requirements (i.e., 450 V) may be exceeded. Therefore, when the coupling coefficient k is greater than 0.17 and the full bridge control is performed, the phase shift full bridge (PSFB) control defined in FIG. 5B may be used instead of the 50% duty control defined in FIG. 5A.

Hereinafter, it will be described whether to operate the WPT system in the full bridge control or the half bridge control depending on the load when the full bridge inverter and the half bridge inverter satisfy other design requirements except the load.

FIGS. 9A to 9D are graphs for explaining a method for determining a control conversion point between a full bridge control and a half bridge control based on a load, according to embodiments of the present disclosure.

As described in FIG. 8, both the half bridge control and the full bridge control can satisfy the design requirements (excluding the load) in the range where the coupling coefficient k is greater than 0.124. In this case, an efficiency for the load ($P_o$) may be calculated according to k, and the load at which the efficiency when controlling by the half bridge inverter and the efficiency when controlling by the full bridge inverter cross may be determined as a control switching point (a switching point where the full bridge control and the switch bridge control is switched to each other).

Figure 9A:
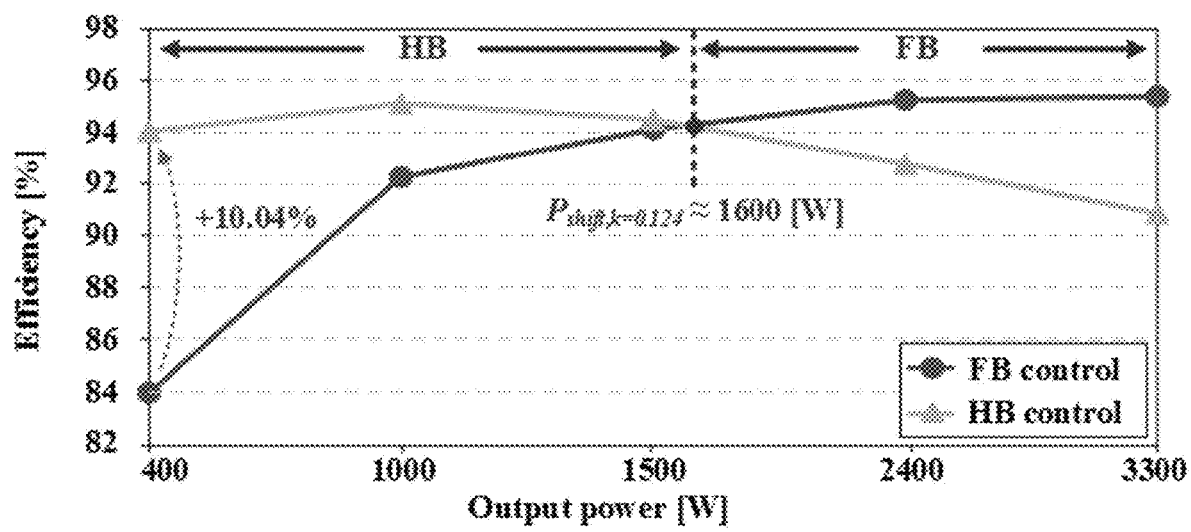
FIGS. 9A to 9D are graphs for explaining a method for determining a control conversion point between a full bridge control and a half bridge control based on a load, according to embodiments of the present disclosure.

Referring first to FIG. 9A, illustrated is a graph of the efficiency for the load $P_o$ when the coupling coefficient k is 0.124 (the minimum value of the coupling coefficient that satisfies the design requirements of both the full bridge control and the half bridge control in FIG. 8). In FIG. 9A, when the load is less than about 1600 W, the efficiency of the half bridge control is higher, and when the load is larger than about 1600 W, the efficiency of the full bridge control is higher. Thus, a point where the load is 1600 W may be determined as the control switching point, and when the load passes the control switching point, the full bridge control and the half bridge control may be switched to each other.

Figure 9B:
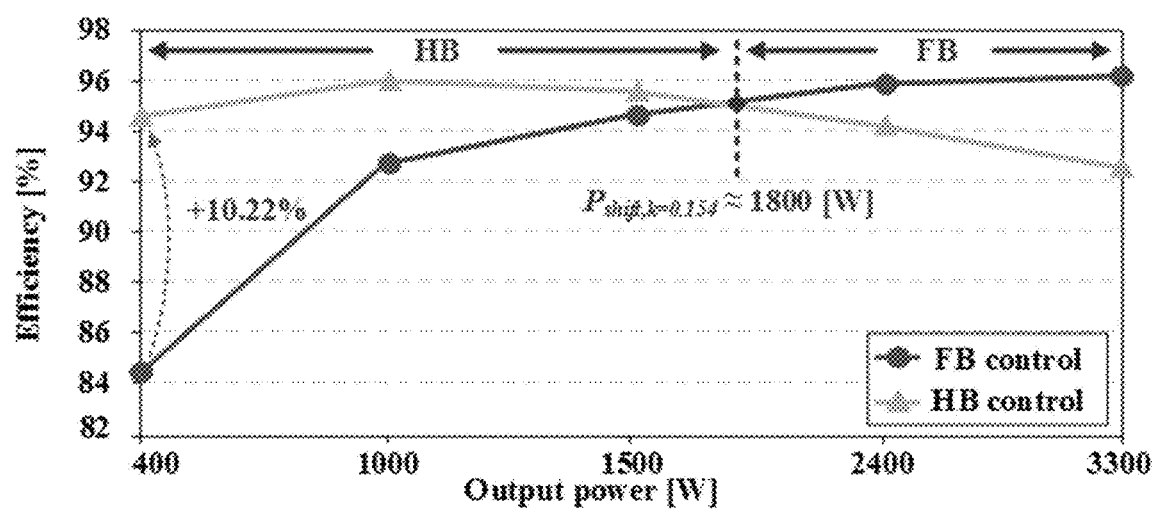

Referring next to FIG. 9B, illustrated is a graph of the efficiency for the load $P_o$ when the coupling coefficient k is 0.154. In FIG. 9B, when the load is less than about 1800 W, the efficiency of the half bridge control is higher, and when the load is greater than about 1800 W, the efficiency of the full bridge control is higher. Therefore, a point where the load is 1800 W may be determined as the control switching point, and when the load passes the control switching point, the full bridge control and the half bridge control may be switched to each other.

Figure 9C:
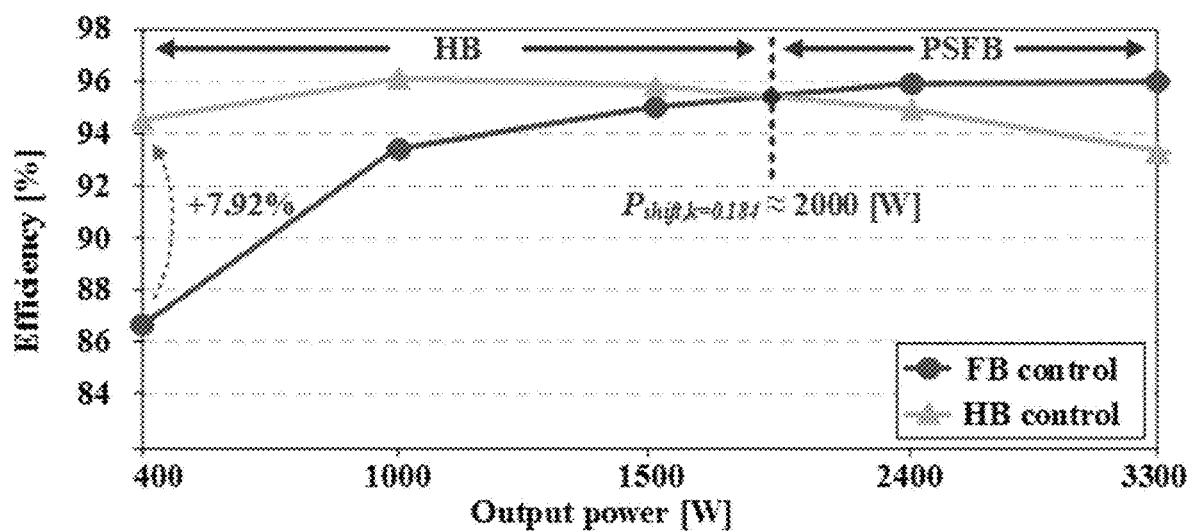

Referring next to FIG. 9C, illustrated is a graph of the efficiency for the load $P_o$ when the coupling coefficient k is 0.184. In FIG. 9C, when the load is less than about 2000 W, the efficiency of the half bridge control is higher, and when the load is greater than about 2000 W, the efficiency of the full bridge control is higher. Therefore, a point where the load is 2000 W may be determined as the control switching point, and when the load passes the control switching point, the full bridge control and the half bridge control may be switched to each other. However, in this case, as shown in FIG. 8, when the coupling coefficient k is 0.184, the output voltage may exceed the maximum value of the output voltage defined by the design requirements. Therefore, the PSFB control instead of the general full bridge control (or, the 50% duty control) and the half bridge control may be switched to each other.

Figure 9D:
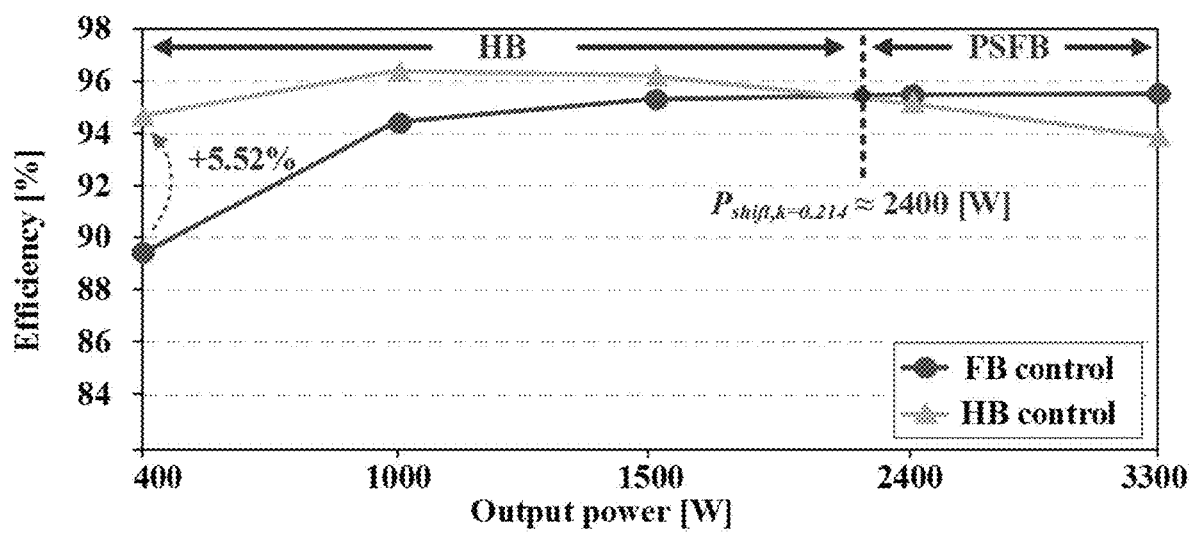

Referring next to FIG. 9D, the control switching point for the load may be determined to be 2400 W as in FIG. 9C. When the load passes 2400 W, the PSFB control and the half bridge control may be switched to each other.

As shown in FIGS. 9A to 9D, the efficiency relative to the load according to the coupling coefficient k is calculated in units of 0.3 from the minimum value (i.e., 0.124) of the coupling coefficient satisfying the design requirement, but the present disclosure is not limited thereto. It is also possible to determine the control switching point by calculating the efficiency in further fine units.

Figure 10:
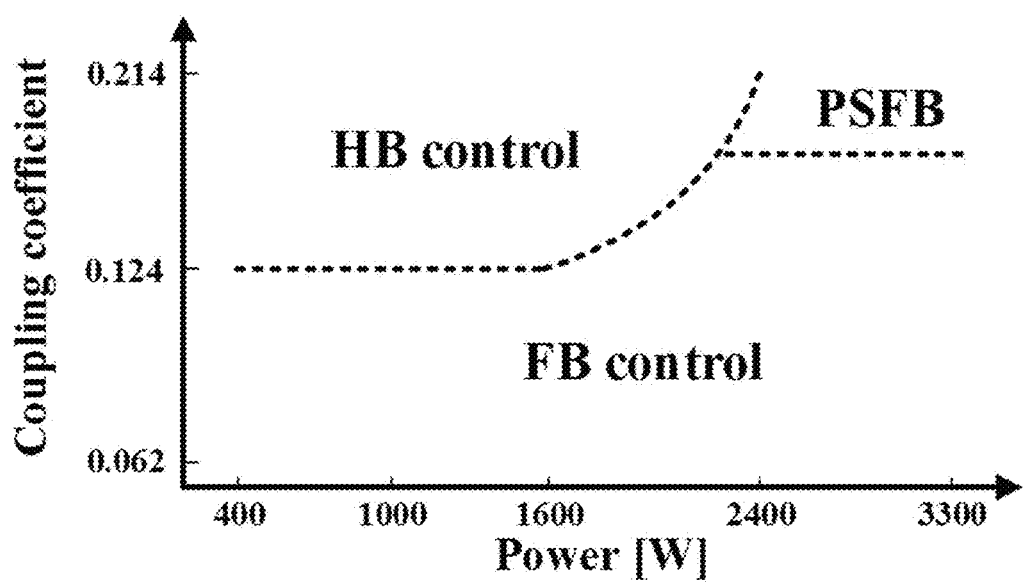
FIG. 10 is a graph for explaining an operation region of a full bridge control and a half bridge control according to embodiments of the present disclosure.

FIG. 10 is a graph for explaining an operation region of a full bridge control and a half bridge control according to embodiments of the present disclosure.

As shown in FIG. 10, illustrated is a graph representing an operation region of the full bridge control and the half bridge control in consideration of the control switching points according to FIGS. 8 and 9A to 9D.

Specifically, as described with reference to FIG. 8, the full bridge control may be always applied in a region where the coupling coefficient k is less than 0.124. Also, in a region where the coupling coefficient is larger than 0.124, the full bridge control and the half bridge control may be selectively applied according to the load (i.e., horizontal axis (power)).

Also, in a region where the coupling coefficient is greater than 0.17, the PSFB control and the half bridge control may be selectively applied according to the load.

Figure 11:
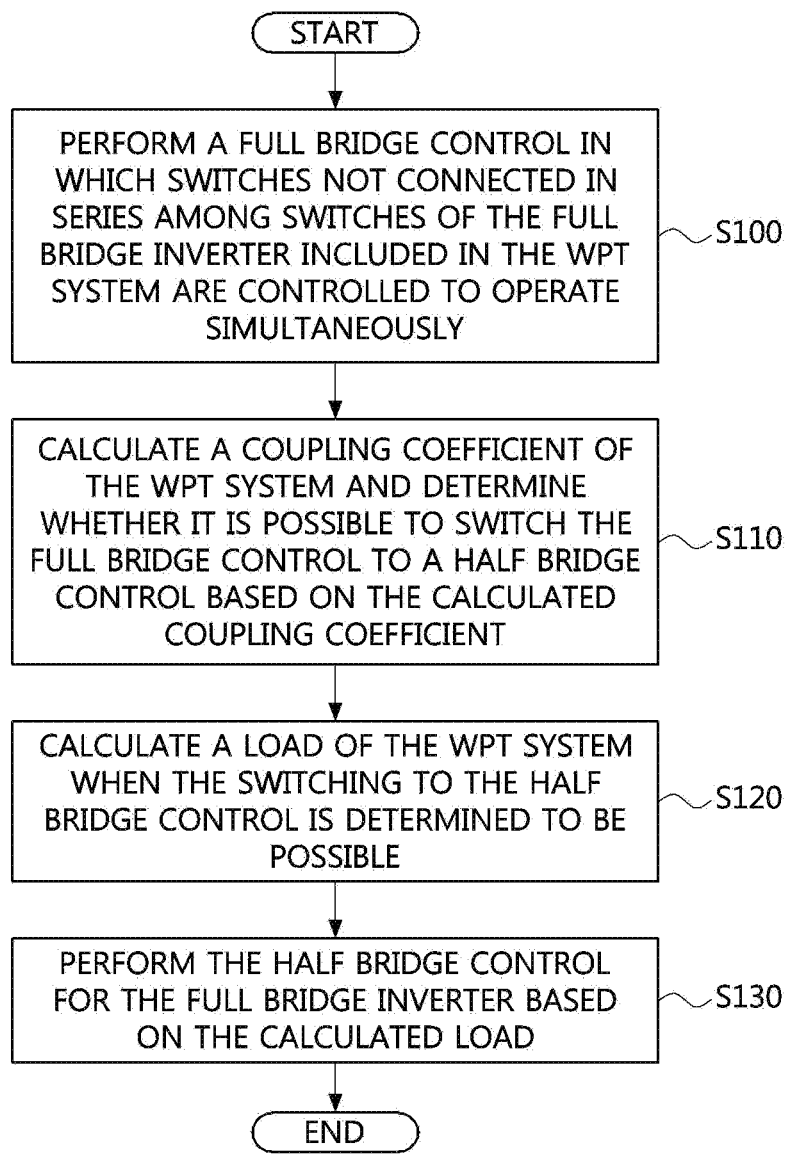
FIG. 11 is a flowchart illustrating a method for selectively performing a full bridge control and a half bridge control in a WPT system using an LCCL-S resonant network according to embodiments of the present disclosure.

FIG. 11 is a flowchart illustrating a method for selectively performing a full bridge control and a half bridge control in a WPT system using an LCCL-S resonant network according to embodiments of the present disclosure.

As shown in FIG. 11, a method according to embodiments of the present disclosure may comprise a step S100 of performing a full bridge control in which the switches not connected in series among the switches of the full bridge inverter included in the WPT system are controlled to operate simultaneously, a step S110 of calculating a coupling coefficient of the WPT system and determining whether it is possible to switch the full bridge control to a half bridge control based on the calculated coupling coefficient, a step of S120 of calculating a load of the WPT system when the switching to the half bridge control is determined to be possible, and a step S130 of performing the half bridge control for the full bridge inverter based on the calculated load. In this case, the coupling coefficient of the WPT system may be arithmetically determined using a measured output voltage.

The half bridge control may be a control scheme in which one of the switches connected in series among the switches of the full bridge inverter is controlled to be in the ON or OFF state at all times to control the full bridge inverter to operate in a manner equivalent to the half bridge inverter.

The step S110 may include a step of determining a coupling coefficient range in which the half bridge control satisfies the design requirements and a step of comparing a threshold value according to the determined coupling coefficient range with the calculated coupling coefficient.

The design requirements may be predefined for at least one of coupling coefficient, output voltage, and load of the WPT system.

The step S130 may include a step of comparing the calculated load with a control switching point predetermined according to the coupling coefficient range, and performing the half bridge control according to a result of the comparison.

The control switching point may refer to a load depending on a point where the efficiency of the full bridge control and the efficiency of the half bridge control cross in the coupling coefficient range.

The WPT system may comprise the full bridge inverter receiving a DC power source and outputting an AC voltage, a compensation network receiving the AC voltage from the full bridge inverter and generating an induced electromotive force in a reception coil incorporated in a reception pad of the EV, a rectifier rectifying an induced current according to the induced electromotive force and storing a DC voltage in a capacitor, and a DC-DC converter converting the DC voltage stored in the capacitor of the rectifier into a rated voltage of a battery built in the EV.

The full bridge inverter may include a first series circuit in which a first switch $Q_1$ and a third switch $Q_3$ are connected in series and a second series circuit in which a fourth switch $Q_4$ and a second switch $Q_2$ are connected in series. The first series circuit and the second series circuit may be connected in parallel with the DC power source.

In the step S100, the first switch and the second switch as a first pair may be operated simultaneously in ON or OFF state, and the third switch and the fourth switch as a second pair may be operated simultaneously in OFF or ON state. That is, the first pair and the second pair may operate alternately.

In the step S130, the second switch may be always kept in ON state, the fourth switch may be always kept in OFF state, and the first switch and the third switch may be operated alternately.

Figure 12:
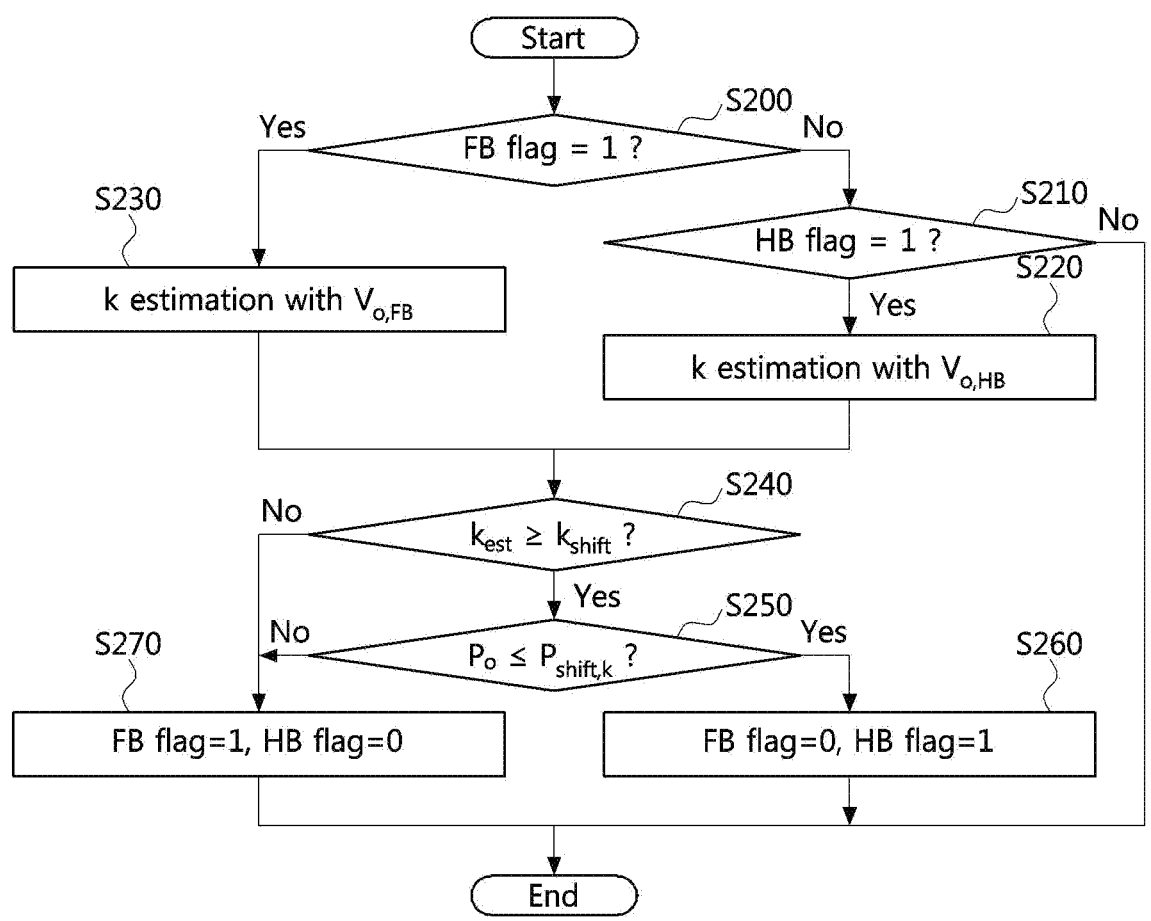
FIG. 12 is a flowchart illustrating an additional method for selectively performing a full bridge control and a half bridge control in a WPT system using an LCCL-S resonant network according to embodiments of the present disclosure.

FIG. 12 is a flowchart illustrating an additional method for selectively performing a full bridge control and a half bridge control in a WPT system using an LCCL-S resonant network according to embodiments of the present disclosure.

As shown in FIG. 12, it may be determined whether the WPT system is currently operating under the full bridge control (S200). That is, it may be determined whether or not a control flag (e.g., FB flag) indicating whether the WPT system is operating under the full bridge control is active (e.g., when the flag is set to 1).

If it is determined in the step S200 that the WPT system is operating under the full bridge control, the output voltage $V_{o,FB}$ according to the full bridge control may be measured and the coupling coefficient $k_{est}$ may be calculated based on the measured output voltage (S230).

On the other hand, if it is determined in the step S200 that the WPT system is not operating under the full bridge control, it may be determined whether or not a control flag (e.g., HB flag) indicating whether the WPT system is operating under the half bridge control is active (e.g., when the flag is set to 1) (S210). Here, if it is determined in the step S210 that the WPT system is operating under the half bridge control, the output voltage $V_{o,HB}$ according to the half bridge control may be measured and the coupling coefficient $k_{est}$ may be calculated based on the measured output voltage $V_{o,HB}$ (S220).

Then, the calculated coupling coefficient $k_{est}$ may be compared with a threshold value $k_{shift}$ indicating that the WPT system can be operated under the half bridge control (S240). As a result of the comparison, if it is determined that the calculated coupling coefficient $k_{est}$ is within the range of the coupling coefficient in which the WPT system can be operated under the half bridge control (e.g., when the calculated coupling coefficient is greater than or equal to the threshold value), the load $P_o$ according to the WPT system may be compared with the control switching point $P_{shift, k}$ (S250).

Here, if the load $P_o$ according to the WPT system is less than or equal to the control switching point $P_{shift,k}$, the full bridge control may be stopped (i.e., FB flag is set to 0) and the half bridge control may be performed (i.e., HB flag is set to 1) (S260).

On the other hand, as the result of the comparison in the step S240 or S250, if the coupling coefficient is not within the coupling coefficient range in which the WPT system can be operated under the half bridge control or the load $P_o$ is larger than the control switching point $P_{shift,k}$, the full bridge control may be applied instead of the half bridge control (S270).

FIGS. 13A to 13D are graphs comparing a conventional method of performing only a full bridge control with a method of selectively performing a full bridge control and a half bridge control according to embodiments of the present disclosure.

As shown in FIGS. 13A to 13D, it can be seen that the method (indicated by "FB-HB") according to embodiments of the present disclosure shows a higher efficiency compared with the conventional method (indicated by "FB") using only the full bridge control.

Figure 13A:
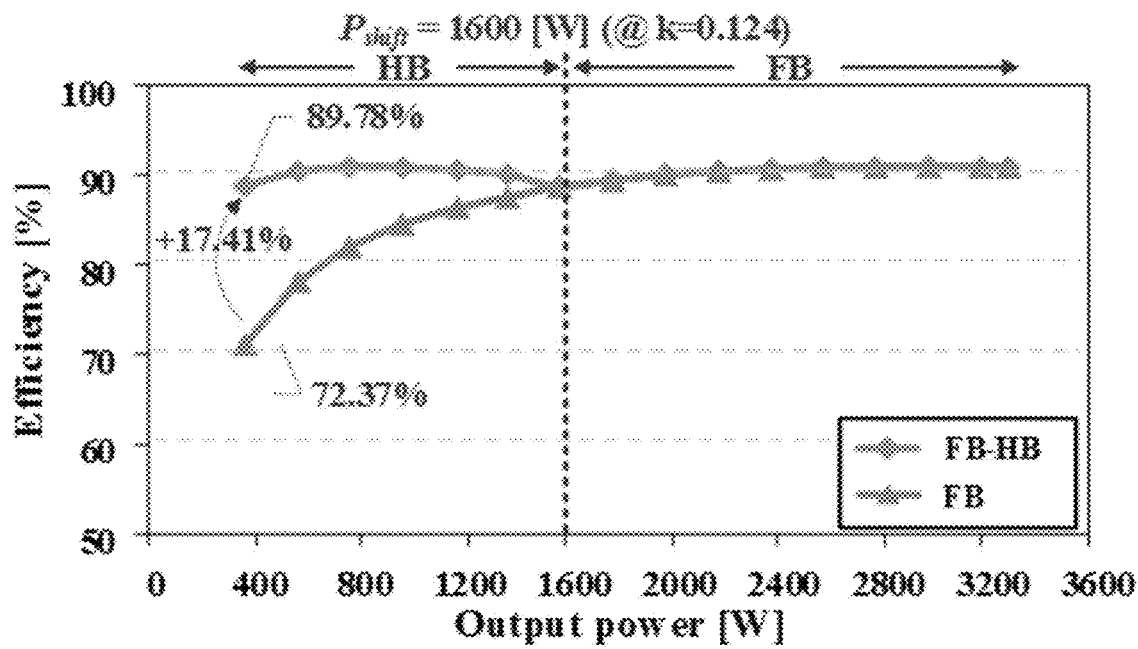
FIGS. 13A to 13D are graphs comparing a conventional method of performing only a full bridge control with a method of selectively performing a full bridge control and a half bridge control according to embodiments of the present disclosure.

Specifically, as shown in FIG. 13A showing the efficiency according to the load when the coupling coefficient is 0.124, the efficiency is improved by 17.41% at the light load.

Figure 13B:
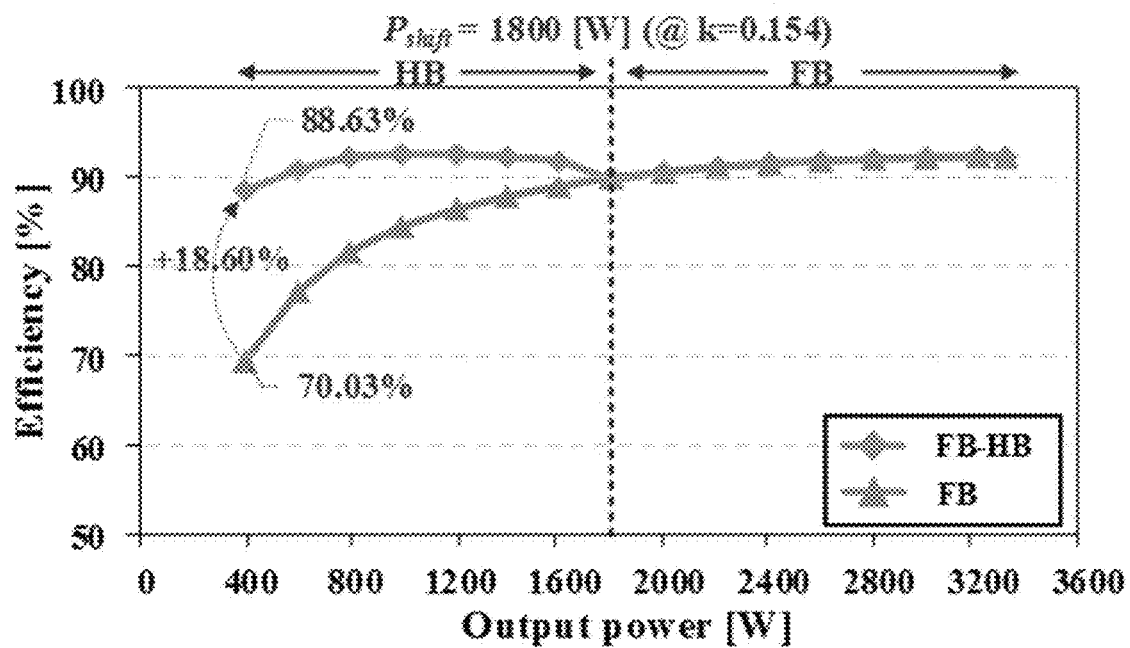

Also, as shown in FIG. 13B showing the efficiency according to the load when the coupling coefficient is 0.154, the efficiency is improved by 18.60% at the light load.

Figure 13C:
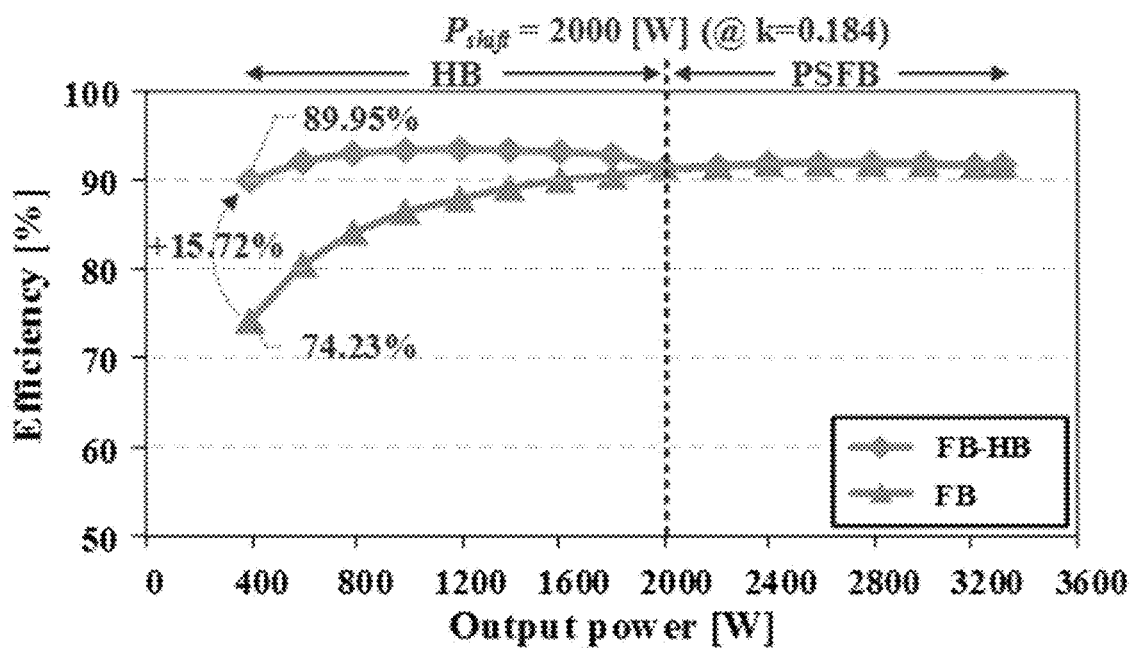

Also, as shown in FIG. 13C showing the efficiency according to the load when the coupling coefficient is 0.184, the efficiency is improved by 15.72% at the light load.

Figure 13D:
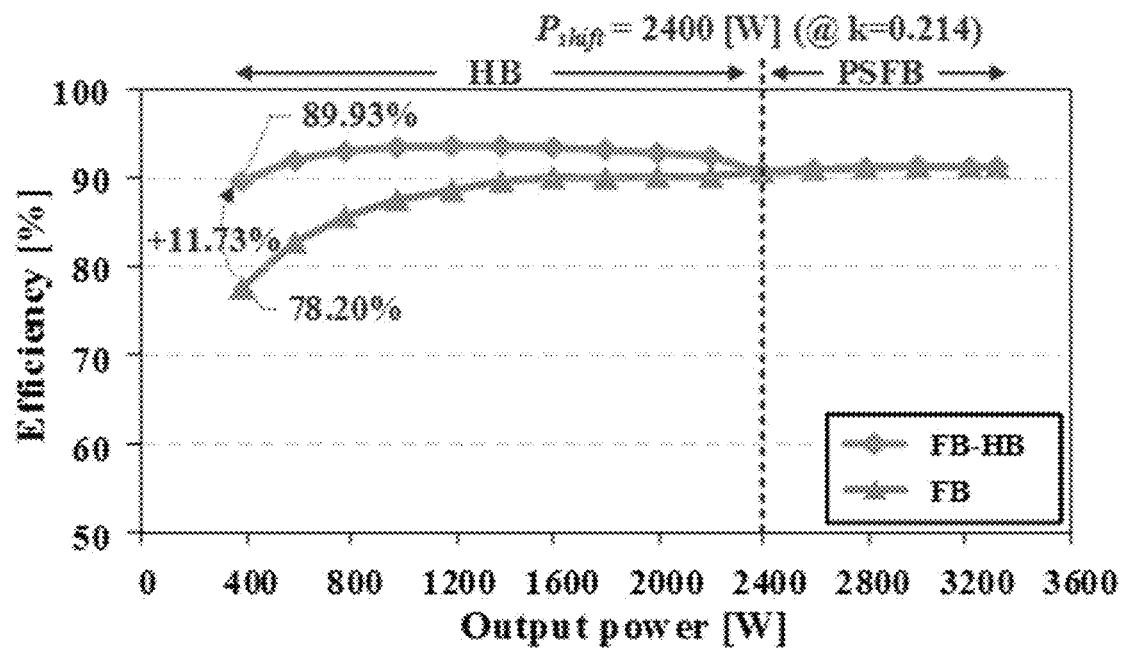

Also, as shown in FIG. 13D showing the efficiency according to the load when the coupling coefficient is 0.214, the efficiency is improved by 11.73% at the light load.

That is, it can be seen that the method for selectively performing the full bridge control and the half bridge control according to the embodiment of the present disclosure has a particularly high efficiency at the light load (e.g., 400 W).

Figure 14:
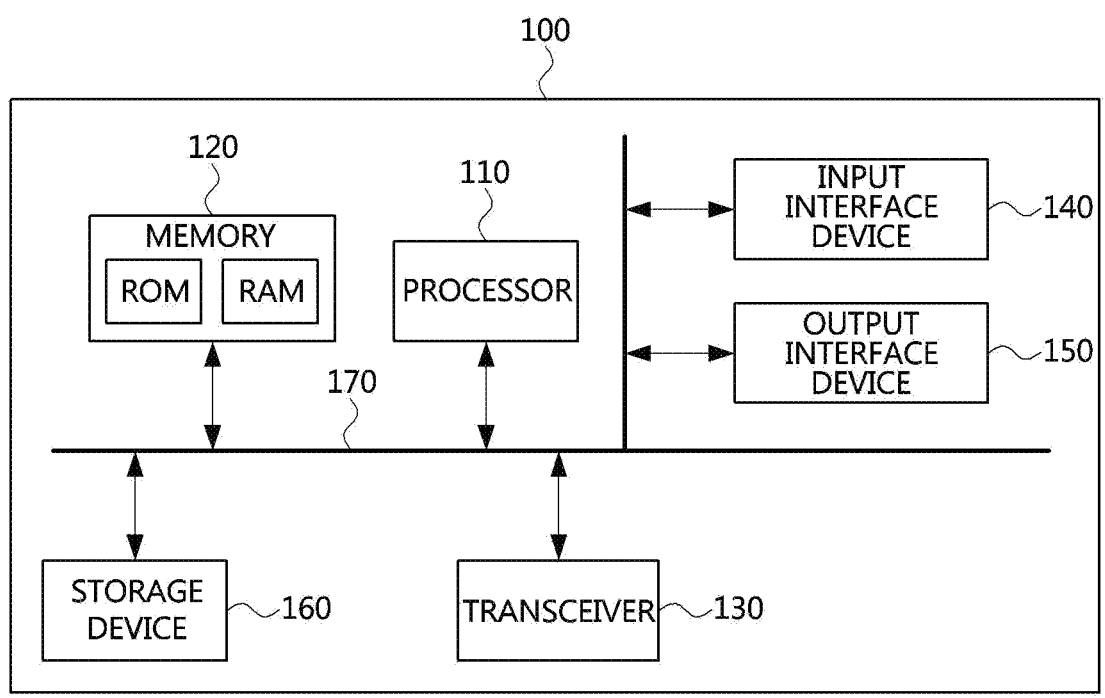
FIG. 14 is a block diagram illustrating an apparatus for selectively performing a full bridge control and a half bridge control in a WPT system using an LCCL-S resonant network according to embodiments of the present disclosure.

FIG. 14 is a block diagram illustrating an apparatus for selectively performing a full bridge control and a half bridge control in a WPT system using an LCCL-S resonant network according to embodiments of the present disclosure.

As shown in FIG. 14, an apparatus 100 for selectively performing a full bridge control and a half bridge control in a WPT system using an LCCL-S resonant network may comprise at least one processor 110, and a memory 120 that stores instructions that direct the at least one processor 110 to perform at least one step. Also, the apparatus 100 may further include a storage device 160.

The at least one step may comprise a step of performing a full bridge control in which the switches not connected in series among the switches of the full bridge inverter included in the WPT system are controlled to operate simultaneously, a step of calculating a coupling coefficient of the WPT system and determining whether it is possible to switch the full bridge control to a half bridge control based on the calculated coupling coefficient, a step of calculating a load of the WPT system when the switching to the half bridge control is determined to be possible, and a step of performing the half bridge control for the full bridge inverter based on the calculated load.

The half bridge control may be a control scheme in which one of the switches connected in series among the switches of the full bridge inverter is controlled to be in ON or OFF state at all times to control the full bridge inverter to operate in a manner equivalent to the half bridge inverter.

The step of determining whether it is possible to switch the full bridge control to a half bridge control may include a step of determining a coupling coefficient range in which the half bridge control satisfies the design requirement and a step of comparing a threshold value according to the determined coupling coefficient range with the calculated coupling coefficient.

The design requirements may be predefined for at least one of coupling coefficient, output voltage, and load of the WPT system.

The step of performing the half bridge control may include a step of comparing the calculated load with a control switching point predetermined according to the coupling coefficient range, and performing the half bridge control according to a result of the comparison.

The control switching point may refer to a load depending on a point where the efficiency of the full bridge control and the efficiency of the half bridge control cross in the coupling coefficient range.

The WPT system may comprise the full bridge inverter receiving a DC power source and outputting an AC voltage, a compensation network receiving the AC voltage from the full bridge inverter and generating an induced electromotive force in a reception coil incorporated in a reception pad of the EV, a rectifier rectifying an induced current according to the induced electromotive force and storing a DC voltage in a capacitor, and a DC-DC converter converting the DC voltage stored in the capacitor of the rectifier into a rated voltage of a battery built in the EV.

The full bridge inverter may include a first series circuit in which a first switch $Q_1$ and a third switch $Q_3$ are connected in series and a second series circuit in which a fourth switch $Q_4$ and a second switch $Q_2$ are connected in series. The first series circuit and the second series circuit may be connected in parallel with the DC power source.

In the step of performing the full bridge control, the first switch and the second switch as a first pair may be operated simultaneously in ON or OFF state, and the third switch and the fourth switch as a second pair may be operated simultaneously in OFF or ON state. That is, the first pair and the second pair may operate alternately.

In the step of performing the half bridge control, the second switch may be always kept in ON state, the fourth switch may be always kept in OFF state, and the first switch and the third switch may be operated alternately with each other.

Here, the at least one processor 110 may be a central processing unit (CPU), a graphics processing unit (GPU), or a dedicated processor on which methods in accordance with embodiments of the present disclosure are performed. Each of the memory 120 and the storage device 160 may be constituted of at least one of a volatile storage medium and a non-volatile storage medium. For example, the memory 120 may comprise at least one of a read only memory (ROM) and a random access memory (RAM).

Also, the apparatus 100 may further comprise a transceiver 130 for performing communications via a wired network or a wireless network. Also, the apparatus 100 may further comprise an input interface device 140, an output interface device 150, and the like. The respective components included in the apparatus 100 may perform communications with each other by being connected via a common bus 170 or a dedicated signal line.

In addition, the apparatus 100 may be implemented by being coupled to the charging station 20 or the ground assembly (GA) according to FIG. 1.

While some aspects of the present disclosure have been described in the context of an apparatus, it may also represent a description according to a corresponding method, wherein the block or apparatus corresponds to a method step or a feature of the method step. Similarly, aspects described in the context of a method may also be represented by features of the corresponding block or item or corresponding device. Some or all of the method steps may be performed by (or using) a hardware device such as, for example, a microprocessor, a programmable computer, or an electronic circuit. In various exemplary embodiments, one or more of the most important method steps may be performed by such an apparatus.

In embodiments of the present disclosure, a programmable logic device (e.g., a field programmable gate array (FPGA)) may be used to perform some or all of the functions of the methods described herein. In embodiments of the present disclosure, the FPGA may operate in conjunction with a microprocessor to perform one of the methods described herein. Generally, the methods are preferably performed by some hardware device.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teachings. The embodiments were chosen and described to explain certain principles of the disclosure and their practical application, to enable others skilled in the art to make and utilize various embodiments of the present disclosure, as well as various alternatives and modifications thereof. It is intended that the scope of the disclosure be defined by the claims appended hereto and their equivalents.

What is claimed is:

1. A method for selectively performing a full bridge control and a half bridge control in a wireless power transfer (WPT) system using an inductance-capacitance-capacitance-inductance-series (LCCL-S) resonant network, the WPT system including a full bridge inverter having one or more switches connected in series and one or more switches not connected in series, the method comprising:
performing the full bridge control by controlling the switches in the full bridge inverter;
calculating a coupling coefficient of the WPT system;
determining whether it is possible to switch the full bridge control to the half bridge control based on the calculated coupling coefficient;
in response to determining that it is possible to switch the full bridge control to the half bridge control, calculating a load of the WPT system; and
performing the half bridge control for the full bridge inverter based on the calculated load,
wherein the full bridge inverter comprises a first series circuit in which a first switch and a third switch are connected in series, and a second series circuit in which a fourth switch and a second switch are connected in series,
wherein the first series circuit and the second series circuit are connected in parallel with the DC power source,
wherein performing the full bridge control comprises operating the first switch or the third switch in the first series circuit and operating the fourth switch or the second switch in the second series circuit simultaneously in an ON or OFF state; and
wherein performing the half bridge control comprises:
operating the second switch in an ON state; and
operating the fourth switch in an OFF state,
the first switch and the third switch being operated alternately.

2. The method according to claim 1, wherein the performing of the half bridge control comprises controlling one of the one or more switches connected in series of the full bridge inverter to be in an ON or OFF state at all times, causing the full bridge inverter to operate in a manner equivalent to a half bridge inverter.

3. The method according to claim 1, wherein the determining of whether it is possible to switch the full bridge control to the half bridge control comprises:
determining a coupling coefficient range in which the half bridge control satisfies one or more design requirements; and
comparing the calculated coupling coefficient with a threshold value according to the determined coupling coefficient range.

4. The method according to claim 3, wherein the one or more design requirements are predefined for at least one of the coupling coefficient, an output voltage, and the load of the WPT system.

5. The method according to claim 3, wherein the performing of the half bridge control comprises:
comparing the calculated load with a control switching point predetermined according to the coupling coefficient range; and
performing the half bridge control according to the comparing of the calculated load with a control switching point.

6. The method according to claim 5, wherein the control switching point refers to a load corresponding to a position where an efficiency of the full bridge control and an efficiency of the half bridge control intersect in the coupling coefficient range.

7. The method according to claim 1, further comprising:
receiving, by the full bridge inverter, a direct current (DC) power source;
outputting, by the full bridge inverter, an alternating current (AC) voltage;
receiving, by a compensation network, the AC voltage from the full bridge inverter;
generating, by a compensation network, an induced electromotive force in a reception coil incorporated in a reception pad of an electric vehicle (EV);
rectifying, by a rectifier, an induced current according to the induced electromotive force;
storing, by the rectifier, a DC voltage in a capacitor; and
converting, by the a DC-DC converter, the DC voltage stored in the capacitor of the rectifier into a rated voltage of a battery equipped in the EV.

8. The method according to claim 1, wherein the performing of the full bridge control comprises:
operating the first switch and the second switch as a first pair simultaneously in an ON or OFF state; and
operating the third switch and the fourth switch as a second pair simultaneously in an OFF or ON state,
wherein the first pair and the second pair are operated alternately.

9. An apparatus for selectively performing a full bridge control and a half bridge control in a wireless power transfer (WPT) system using an inductance-capacitance-capacitance-inductance-series (LCCL-S) resonant network, the WPT system including a full bridge inverter having one or more switches connected in series and one or more switches not connected in series, the apparatus comprising:
at least one processor; and
a memory storing at least one instruction, which when executed by the at least one processor cause the processor to:
perform the full bridge control by controlling the switches in the full bridge inverter;
calculate a coupling coefficient of the WPT system;
determine whether it is possible to switch the full bridge control to the half bridge control based on the calculated coupling coefficient;
in response to determining that it is possible to switch the full bridge control to the half bridge control, calculate a load of the WPT system; and
perform the half bridge control for the full bridge inverter based on the calculated load,
wherein the full bridge inverter comprises a first series circuit in which a first switch and a third switch are connected in series, and a second series circuit in which a fourth switch and a second switch are connected in series,
wherein the first series circuit and the second series circuit are connected in parallel with the DC power source,
wherein the processor is configured to perform the full bridge control by operating the first switch or the third switch in the first series circuit and operating the fourth switch or the second switch in the second series circuit simultaneously in an ON or OFF state; and
wherein the processor is configured to perform the half bridge control by operating the second switch in an ON state and operating the fourth switch in an OFF state, the first switch and the third switch being operated alternately.

10. The apparatus according to claim 9, wherein the performing of the half bridge control comprises controlling one of the one or more switches connected in series of the full bridge inverter to be in an ON or OFF state at all times, causing the full bridge inverter to operate in a manner equivalent to a half bridge inverter.

11. The apparatus according to claim 9, wherein the determining of whether it is possible to switch the full bridge control to the half bridge control:
determining a coupling coefficient range in which the half bridge control satisfies one or more design requirements; and
comparing the calculated coupling coefficient with a threshold value according to the determined coupling coefficient range.

12. The apparatus according to claim 11, wherein the one or more design requirements are predefined for at least one of the coupling coefficient, an output voltage, and the load of the WPT system.

13. The apparatus according to claim 11, wherein the performing of the half bridge control comprises:
comparing the calculated load with a control switching point predetermined according to the coupling coefficient range; and
performing the half bridge control according to the comparing of the calculated load with a control switching point.

14. The apparatus according to claim 13, wherein the control switching point refers to a load corresponding to a position where an efficiency of the full bridge control and an efficiency of the half bridge control intersect in the coupling coefficient range.

15. The apparatus according to claim 9, wherein the WPT system comprises:
the full bridge inverter receiving a direct current (DC) power source and outputting an alternating current (AC) voltage;
a compensation network receiving the AC voltage from the full bridge inverter and generating an induced electromotive force in a reception coil incorporated in a reception pad of an electric vehicle (EV);
a rectifier rectifying an induced current according to the induced electromotive force and storing a DC voltage in a capacitor; and
a DC-DC converter converting the DC voltage stored in the capacitor of the rectifier into a rated voltage of a battery equipped in the EV.

16. The apparatus according to claim 9, wherein the performing of the full bridge control comprises:
operating the first switch and the second switch as a first pair simultaneously in an ON or OFF state;

operating the third switch and the fourth switch as a second pair simultaneously in an OFF or ON state, wherein the first pair and the second pair are operated alternately.

* * * * *